United States Patent
Shimura

(10) Patent No.: US 7,110,831 B2
(45) Date of Patent: Sep. 19, 2006

(54) COMMUNICATION CONTROL METHOD, COMMUNICATION SYSTEM, PRINT CONTROL APPARATUS, PRINTING APPARATUS, HOST APPARATUS, PERIPHERAL APPARATUS, AND STORAGE MEDIUM

(75) Inventor: Akihiro Shimura, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/337,529

(22) Filed: Jan. 24, 2006

(65) Prior Publication Data

US 2006/0123419 A1 Jun. 8, 2006

Related U.S. Application Data

(60) Division of application No. 10/848,235, filed on May 17, 2004, now Pat. No. 7,003,616, which is a continuation of application No. 09/452,206, filed on Dec. 1, 1999, now abandoned.

(30) Foreign Application Priority Data

Dec. 2, 1998 (JP) ............................. 10-342970

(51) Int. Cl.
*G05B 19/18* (2006.01)
*G06F 13/20* (2006.01)
*G06F 3/00* (2006.01)

(52) U.S. Cl. ................... 700/5; 710/313; 710/314; 719/314

(58) Field of Classification Search ............. 710/313, 710/314, 315, 112, 54; 719/314; 718/102; 700/5, 18, 23, 86, 89
See application file for complete search history.

(56) References Cited

U.S. PATENT DOCUMENTS 4,644,533 A * 2/1987 Braff et al. ................. 370/411

(Continued)

FOREIGN PATENT DOCUMENTS

JP 05-189174 7/1993

OTHER PUBLICATIONS

The C Programming Language 2nd Ed, pp. 107-110, "5.6 Pointer Arrays: Pointers to Pointers", Kernighan & Ritchie Prentice Hall Software Series (ISBN 0-13-110362-8), 1988.

(Continued)

*Primary Examiner*—Thomas Pham
(74) *Attorney, Agent, or Firm*—Fitzpatrick, Cella, Harper & Scinto

(57) ABSTRACT

A communication system for issuing commands from an initiator to a target, thereby allowing the target to write or read out data into/from a memory area which the initiator has and exchanging the data. The initiator transmits read and write commands for the memory area to the target so as not to exceed the total number of commands which can be held by the target. The target holds the received read and write commands, holds references to the commands by different queues, and independently processes the commands, so that the number of the commands to be transmitted can be managed efficiently.

9 Claims, 27 Drawing Sheets

U.S. PATENT DOCUMENTS

| | | | |
|---|---|---|---|
| 5,050,066 A * | 9/1991 | Myers et al. | 714/18 |
| 5,333,269 A | 7/1994 | Calvignac et al. | 395/200 |
| 5,363,488 A * | 11/1994 | Hidaka et al. | 710/5 |
| 5,548,791 A * | 8/1996 | Casper et al. | 710/38 |
| 5,758,041 A * | 5/1998 | Shimura | 358/1.14 |
| 5,835,721 A * | 11/1998 | Donahue et al. | 709/224 |
| 6,003,065 A | 12/1999 | Yan et al. | 709/201 |
| 6,055,598 A * | 4/2000 | Lange | 710/310 |
| 6,173,339 B1 * | 1/2001 | Yorimitsu | 710/5 |
| 6,240,474 B1 * | 5/2001 | Guthrie et al. | 710/105 |
| 6,301,639 B1 * | 10/2001 | Cleavinger et al. | 711/112 |
| 6,452,693 B1 | 9/2002 | Isoda et al. | 358/1.16 |
| 6,477,587 B1 | 11/2002 | Isoda et al. | 710/6 |

OTHER PUBLICATIONS

"IEEE Standard for Communicating Among Processors and Peripherals Using Shared Memory (Direct Memory Access—DMA)", IEEE Standard 1212.1-1993 (Jun. 17, 1993), pp. 1-128, XP002235899. Retrieved from "http://ieeexplore.ieee.org/iel1/2773/7632/00316889.pdf?isNumber=7632&prod=IEEESTD&arnumber=316889&arSt=i&ared=&arAuthor=".

Takashi Isoda, "Simple High Performance Transport (SHPT) Presentation Materials", Mar. 31, 1998, Internet Printer Working Group, XP002235011. Retrieved from "ftp://ftp.pwg.org/pub/pwg/p1394/mtg051898/shptpre0405.pdf".

Shigeru Ueda, et al., "Simple High Performance Transport—SHPT (Draft)", Revision 0.5a (Preliminary), May 18, 1998, Internet Printer Working Group, pp. 1-27, XP00235010. Retrieved from "ftp://ftp.pwg.org/pub/pwg/p1394/mtg051898/SHPT05ap.pdf".

* cited by examiner

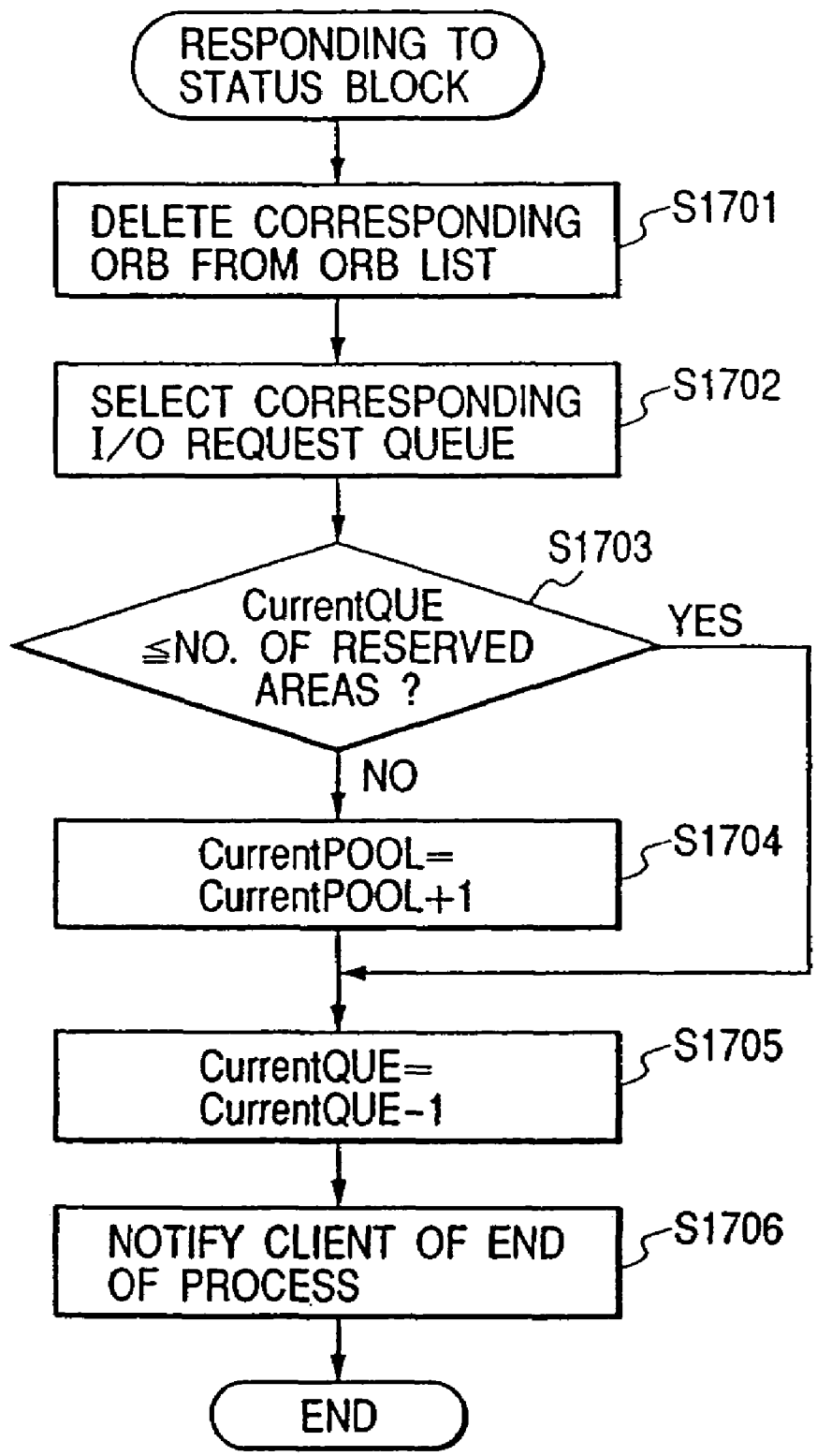

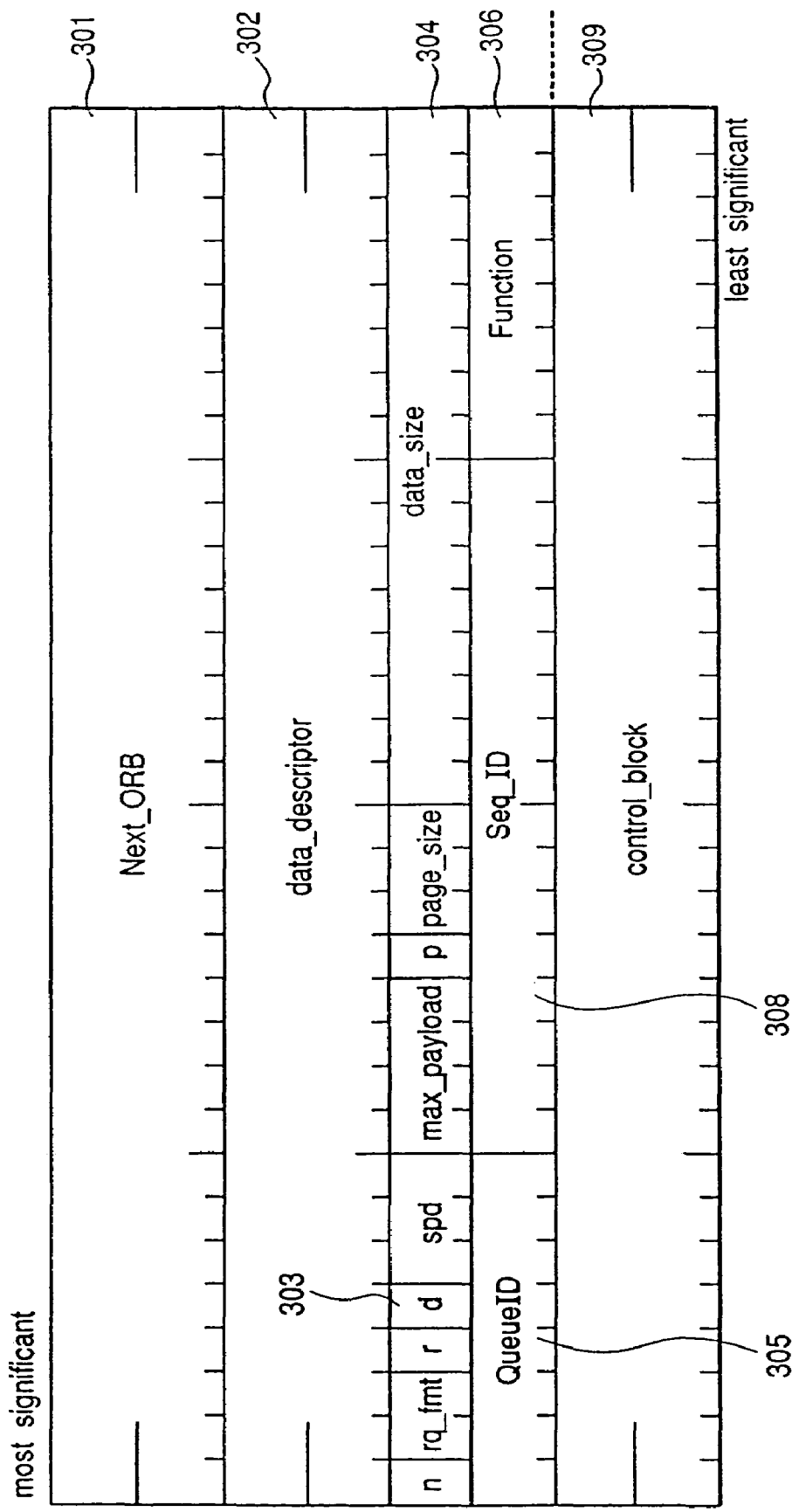

FIG. 7B

| Value | SHPT-2 COMMAND |
|---|---|
| 0 | write |
| 1-3F$_{16}$ | reserved for future standardization |
| 40$_{16}$ | read |
| 41$_{16}$-BF$_{16}$ | reserved for future standardization |
| 80$_{16}$-BF$_{16}$ | service dependent |
| C0$_{16}$ | reserved for future standardization |
| C1$_{16}$ | connect |
| C2$_{16}$ | disconnect |
| C3$_{16}$-FF$_{16}$ | reserved for future standardization |

COMMUNICATION CONTROL METHOD, COMMUNICATION SYSTEM, PRINT CONTROL APPARATUS, PRINTING APPARATUS, HOST APPARATUS, PERIPHERAL APPARATUS, AND STORAGE MEDIUM

This application is a divisional of application Ser. No. 10/848,235, filed May 17, 2004 now U.S. Pat. No. 7,003,616, which is a continuation of application Ser. No. 09/452,206, filed Dec. 1, 1999 (abandoned), the contents of which are incorporated by reference herein.

BACKGROUND OF THE INVENTION

1. Field of the Invention

The invention relates to communication control method and system for connecting equipment such as initiator (host computer) and target (printer or the like).

2. Related Background Art

In recent years, the IEEE1394 interface is being used to connect a computer and peripheral equipment or connect both peripheral equipment. The IEEE1394 interface has a processing speed higher than that of the hand shaking system such as a centronics interface or the like and can perform a bidirectional communication. The IEEE1394 interface is also an interface for a memory bus model and equipment connected by it can read or write data at a designated address from/to partner's equipment.

According to IEEE1394, although a protocol for a physical layer and a link layer to apply it in a wide range is determined, a detailed protocol for each equipment is not decided. Therefore, a protocol for a transport layer such as SBP (Serial Bus Protocol)-2 or the like using IEEE1394 has been proposed as physical/link layers. The transport layer is a layer which provides a data transfer function for an application. The applications using such a layer can mutually exchange data.

The SBP-2 protocol is a protocol utilizing a feature as a memory bus model of IEEE1394, and the reception side of data can receive the data in accordance with circumstances of itself. On the other hand, as protocols other than SBP-2, there are a protocol which can transfer data which is asynchronously generated and a protocol which can realize multichannels. However, such protocols cannot utilize the feature as a memory bus model of IEEE1394. That is, in case of a communication between a host and a printer, data transfer cannot be performed in accordance with circumstances on the printer side and the host has to perform the data transfer while monitoring a status of the printer.

According to SBP-2, in case of transferring data, an operation called "login" is first performed on the transmission side, thereby establishing a channel with a communication partner. In this instance, the login side is called an initiator and the partner side connected to the initiator is called a target. The data transfer is performed by reading or writing data from/into a buffer of the initiator from the target in accordance with an instruction from the initiator. In such a system, the initiator forms an ORB (Operation Request Block) in which an address, a size, and the like of the buffer in which the data to be transmitted has been stored have been written and notifies the target of the address of the ORB. The target reads out or writes the data from/to the initiator on the basis of the address and size written in the ORB in accordance with its own circumstances, forms a status block after completion of those processes, and notifies the initiator of states of the processes.

In case of performing a communication by using the SBP-2 protocol established on IEEE1394, particularly, in the case where a data source such as a host computer or the like is used as an initiator and it is applied to a data transfer from the initiator to peripheral equipment such as a printer apparatus or the like as a target, there are the four following problems.

(Problem 1) A procedure is complicated because of a full duplex communication.

In SBP-2, the data transfer is fundamentally managed by the initiator and the target cannot perform the asynchronous data transfer to the initiator. That is, in SBP-2, when the target wants to transfer data to the initiator, it sends a data reading request to the initiator in an unsolicited status. The initiator forms an ORB in response to it and includes the formed ORB into the end of a list of the pending ORBs (a data transfer request from the initiator to the target and the like are included). Since the ORBs are processed in order from the head, the data is transferred from the target to the initiator for the first time when the process of the ORB on the initiator side is progressed and the ORB processes in response to the data reading request from the target instead of a timing when the target issues the reading request to the initiator. That is, in the case where the bidirectional asynchronous data transfer cannot be performed and the data to be transferred from the target to the initiator is asynchronously generated, for example, assuming that the target is a printer, in the case where an error occurs in the printer, or the like, the data to be transferred immediately to the initiator cannot be momentarily transmitted.

Therefore, for example, to immediately send data which is asynchronously generated from the printer to the host, a login procedure has to be performed by using the printer as an initiator and a data transfer in which the host computer is used as a target has to be performed.

In a situation such that the host computer and the printer mutually login and each of them is the initiator or the target as mentioned above, a process as an initiator and a process as a target have to be provided for both the host computer and the printer. The operation of login has to be also performed by the printer. In a peripheral apparatus such as a printer for handling an image, a large amount of memory resources or processor resources are consumed for image processes. Therefore, costs have to be shaved by simplifying a construction of the apparatuses or resources which are used for applications other than the image processing application have to be saved as much as possible in order to perform the processes promptly. However, as mentioned above, the more often the processes are executed, the larger amount of resources are consumed. This is contrary to the purpose of shaving costs and realization of a high efficiency of processes.

As for the relation between the host computer and the printer, data flowing in each direction is correlated as a relation between print data and a processing situation of it. However, if a channel is set by an independent login with respect to each direction, those data and response have to be mutually concerned and it is necessary to newly add a processing procedure for such a purpose.

As mentioned above, it is not proper to apply IEEE1394 and SBP-2 to the communication between the host computer and the printer apparatus as they are. It is difficult to reduce the resources necessary for each apparatus and improve the efficiency.

(Problem 2) Multichannels cannot be realized.

In recent years, a hybrid apparatus in which various functions are combined as peripheral apparatuses is being used. For example, there is a digital hybrid apparatus or the like such that a facsimile apparatus is used as a scanner unit apparatus, a printer unit apparatus, and a facsimile and can be used from the host computer or the like. When such a hybrid apparatus is used, if a communication is performed through a plurality of independent channels every unit apparatus function, a plurality of functions can be simultaneously used.

In SBP-2, however, since the multichannels cannot be provided, it is difficult to simultaneously use such unit apparatus functions.

(Problem 3) It is impossible to cope with a bus reset.

In IEEE1394, a bus reset occurs when a status change which becomes a cause of a change of a network construction such that new equipment is connected to a 1394 serial bus or the equipment is disconnected or a power source of the connected equipment is turned on or off occurs. The bus reset occurs when a node which detects the status change as mentioned above on the bus transmits a bus resetting signal onto the bus. The generated bus resetting signal is transmitted from one node to another. When all nodes on the network receive the bus resetting signal, a series of operations for the bus reset is performed in each node.

As mentioned above, the bus reset occurs asynchronously with the process in a node on a network. Even in case of a node which is not concerned with a node which becomes a cause of the bus reset with respect to the application, if the bus reset has once occurred, a bus resetting process has to be performed. In the bus resetting step, in the node which performs a communication by SBP-2, the set connection is disconnected. Even if it is re-connected, a guarantee such that the process can be continued from the state just before the bus reset is not given.

Since the initiator transmits commands to the target so as not to exceed the number of commands in each queue, there is a case where commands assured in the queues which are not used are in vain.

SUMMARY OF THE INVENTION

The invention is made in consideration of the above conventional technique and it is an object of the invention to provide communication control method and apparatus which enables a full duplex communication (mutually asynchronous bidirectional communication) and can efficiently use resources such as processes and memories necessary for exchanging data and provide a printing apparatus using such method and apparatus.

Another object of the invention is to provide communication control method and apparatus which realize multichannels and provide a printing apparatus using such method and apparatus.

Still another object of the invention is to provide communication control method and apparatus which guarantee the continuation of processes from a state just before a bus reset even if the bus reset occurs and provide a printing apparatus using such method and apparatus.

Further another object of the invention is to provide a communication control method, a communication system, a print control apparatus, a printing apparatus, a host apparatus, a peripheral apparatus, and a storage medium which can efficiently use resources by unitarily managing the number of commands which can be transmitted from an initiator to a target instead of managing it every queue of the target.

Further another object of the invention is to provide a communication control method, a communication system, a print control apparatus, a printing apparatus, a host apparatus, a peripheral apparatus, and a storage medium, in which an initiator dynamically performs an allocation to all of command pool areas of a target in a multiplex path by queues, thereby improving a communicating efficiency and a resource using efficiency of the target, and the number of command pool areas of the target is increased or decreased in accordance with the number of queues which are used for connection, thereby improving the resource using efficiency of the target.

To accomplish the above objects, according to the invention, there is provided a communication control method of issuing commands from an initiator to a target, thereby allowing the target to write or read out data into/from a memory area which the initiator has and exchanging the data, wherein the initiator transmits read/write commands for the memory area to the target so as not to exceed the total number of commands which can be held in the target, and the target holds the received read/write commands, holds references to the commands by different queues, and individually processes them.

BRIEF DESCRIPTION OF THE DRAWINGS

FIG. 6 is a flowchart for a processing procedure which is executed by the SHPT-2 processor of the initiator when a status block is received;

FIGS. 7A and 7B are diagrams showing a general format of an ORB;

DETAILED DESCRIPTION OF THE PREFERRED EMBODIMENTS (First Embodiment)

Figure 24:
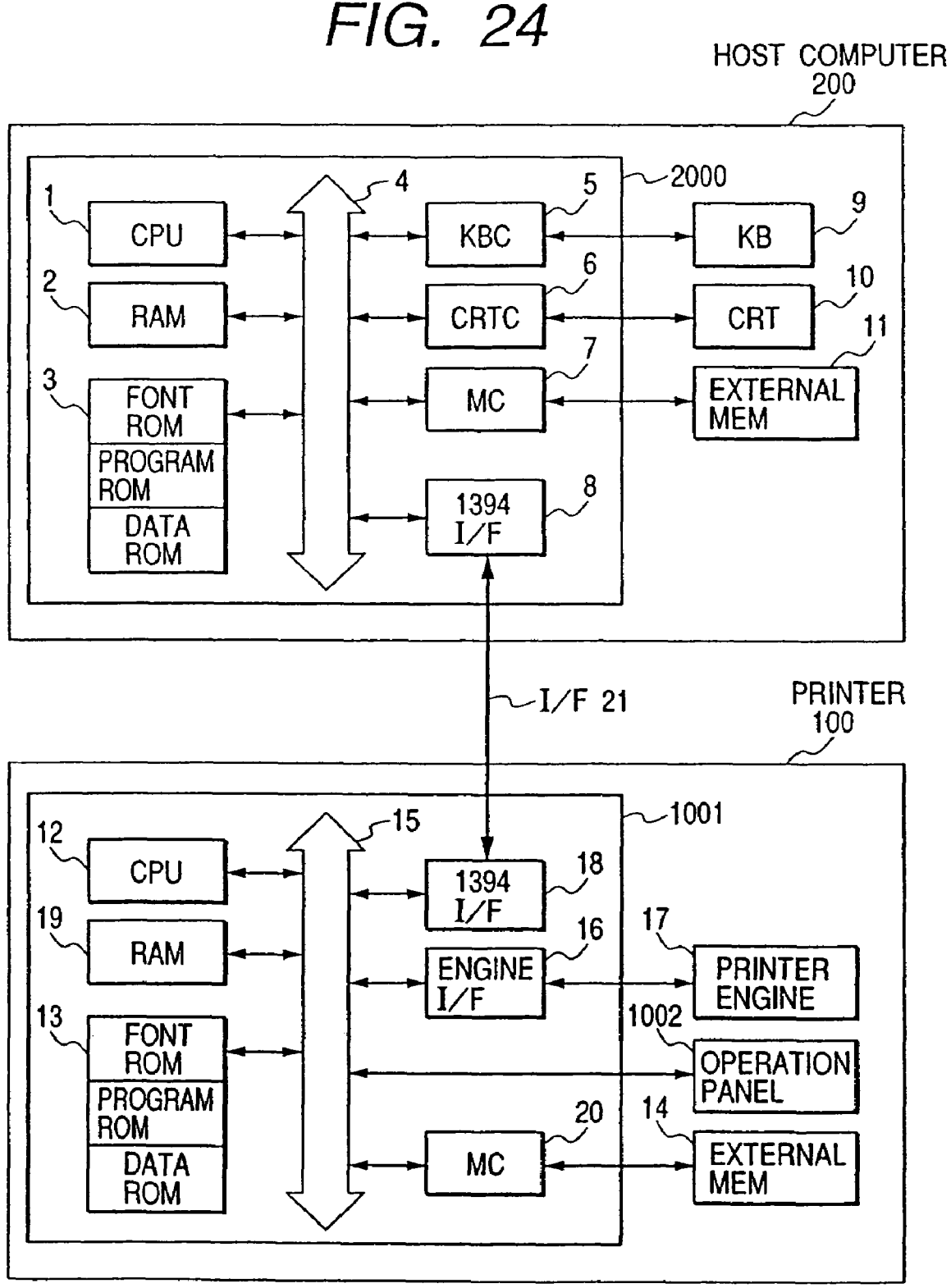
FIG. 24 is a constructional diagram of hardware of a printer system using the IEEE1394 interface.

A printer system in which a host computer and a printer are connected by IEEE1394 and an SBP-2 protocol constructed on IEEE1394 is used and a data transfer is performed in accordance with a protocol (hereinafter, referred to as SHPT-2) according to the invention will now be described as a first embodiment of the invention. FIG. 24 is a constructional diagram of hardware in the printer system.

<Hardware Construction of System>

In FIG. 24, a host computer 200 has a CPU 1 for executing processes of a document in which a figure, an image, characters, a table (including a spreadsheet or the like), and the like mixedly exist on the basis of a document processing program or the like stored in a program ROM of an ROM 3. The CPU 1 integratedly controls each device connected to a system bus 4. A control program and the like of the CPU 1 are stored in the program ROM of the ROM 3. Font data and the like which is used in the document process is stored in a font ROM of the ROM 3. Various data which is used when the document process or the like is executed is stored in a data ROM of the ROM 3. An RAM 2 functions as a main memory, a work area, or the like of the CPU 1.

The programs can be also stored in the RAM 2. A transmission data buffer or a system memory to store an ORB is assured in the RAM 2.

A keyboard controller (KBC) 5 controls a key input from a keyboard 9 or a pointing device (not shown). A CRT controller (CRTC) 6 controls a display on a CRT display (CRT) 10. A memory controller (MC) 7 controls an access to an external memory 11 such as hard disk (HD), floppy disk (FD), or the like to store a boot program, various applications, font data, a user file, an edit file, and the like. A 1394 interface 8 is connected to a printer 100 and executes a communication control process of a communication with the printer 100 in accordance with the IEEE1394 standard. For example, the CPU 1 executes a developing (rasterizing) process of an outline font into a display information RAM set on the RAM 2, thereby enabling WYSIWYG on the CRT 10. The CPU 1 opens various registered windows on the basis of commands instructed by a mouse cursor or the like (not shown) on the CRT 10 and executes various data processes.

In the printer 100, a printer CPU 12 integratedly controls accesses to various devices connected to a system bus 15 on the basis of a control program stored in a program ROM of an ROM 13, a control program stored in an external memory 14, or the like, and outputs an image signal as output information to a printing unit (printer engine) 17 connected through a printing unit interface (engine interface) 16. Various agents, which will be explained hereinlater, a control program for the CPU 12 to realize image processes, and the like are stored in the program ROM of the ROM 13. Font data and the like which are used when the output information is formed are stored in a font ROM of the ROM 13. In case of a printer without the external memory 14 such as a hard disk or the like, information and the like which are used on the host computer are stored in a data ROM of the ROM 13. The CPU 12 can execute a communicating process of a communication with the host computer through a 1394 interface 18 and notify the host computer 200 of information or the like in the printer.

An RAM 19 functions as a main memory, a work area, or the like of the CPU 12 and is constructed so that a memory capacity can be expanded by an option RAM which is connected to an expanding port (not shown). The RAM 19 is used as an output information rasterizing area, an environmental data memory area, an NVRAM, or the like. An access to the external memory 14 such as hard disk (HD), IC card, or the like mentioned above is controlled by a memory controller (MC) 20. The external memory 14 is connected as an option and stores font data, an emulation program, form data, and the like. Switches for operation, an LED display, and the like are arranged on an operation panel 1002. The number of external memories is not limited to 1. The apparatus can be also constructed in a manner such that at least one or more external memories are provided and an option font card in addition to built-in fonts and a plurality of external memories in which programs to interpret printer control languages of different language systems have been stored can be connected. Further, the apparatus can have an NVRAM (not shown) and store printer mode set information from the operation panel 1002.

Although not shown, a finisher having a stapler function, a sorter function, and the like can be also connected.

<Construction of Initiator>

Figure 1:
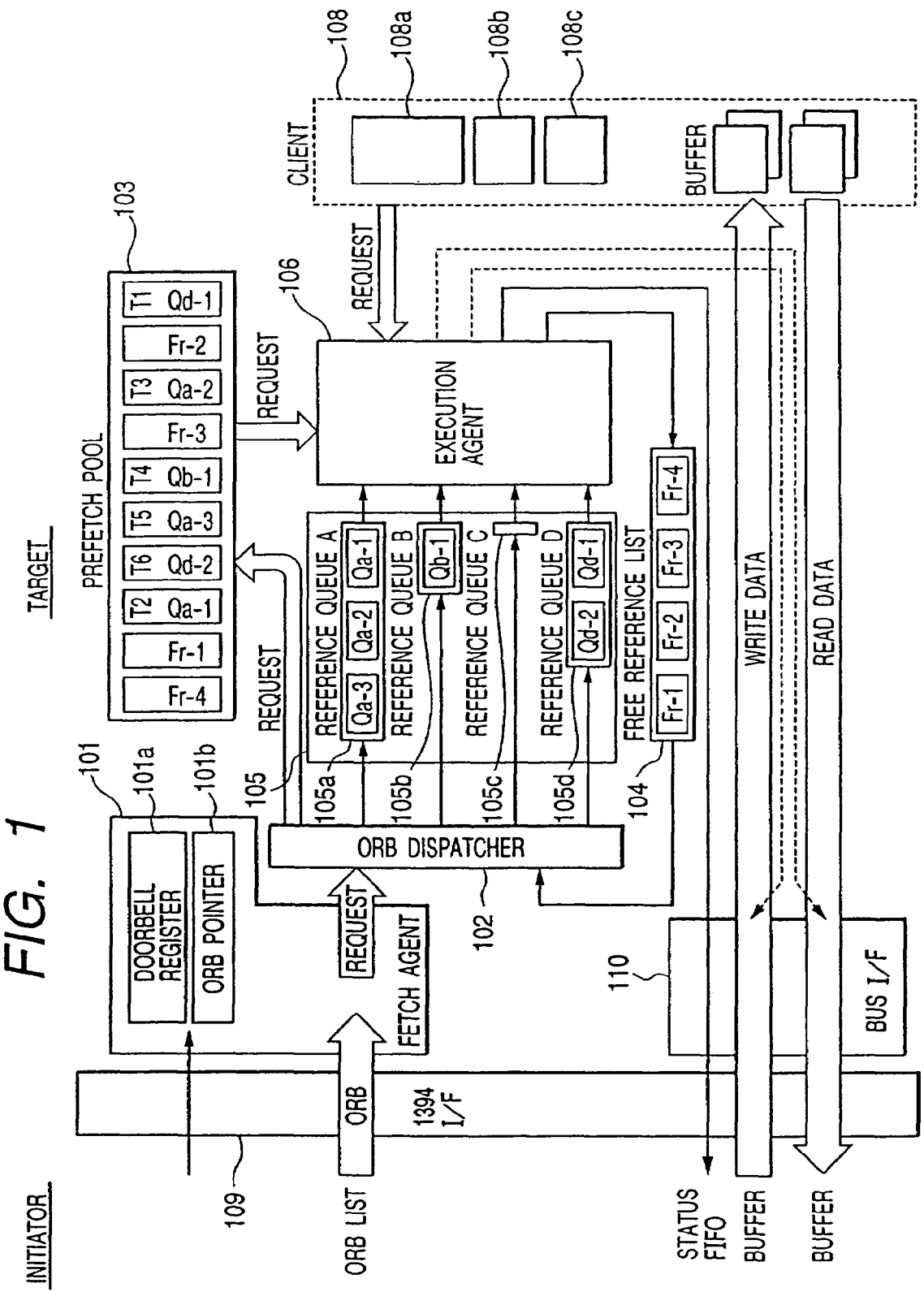
FIG. 1 is a block diagram of a target (printer)
Figure 2:
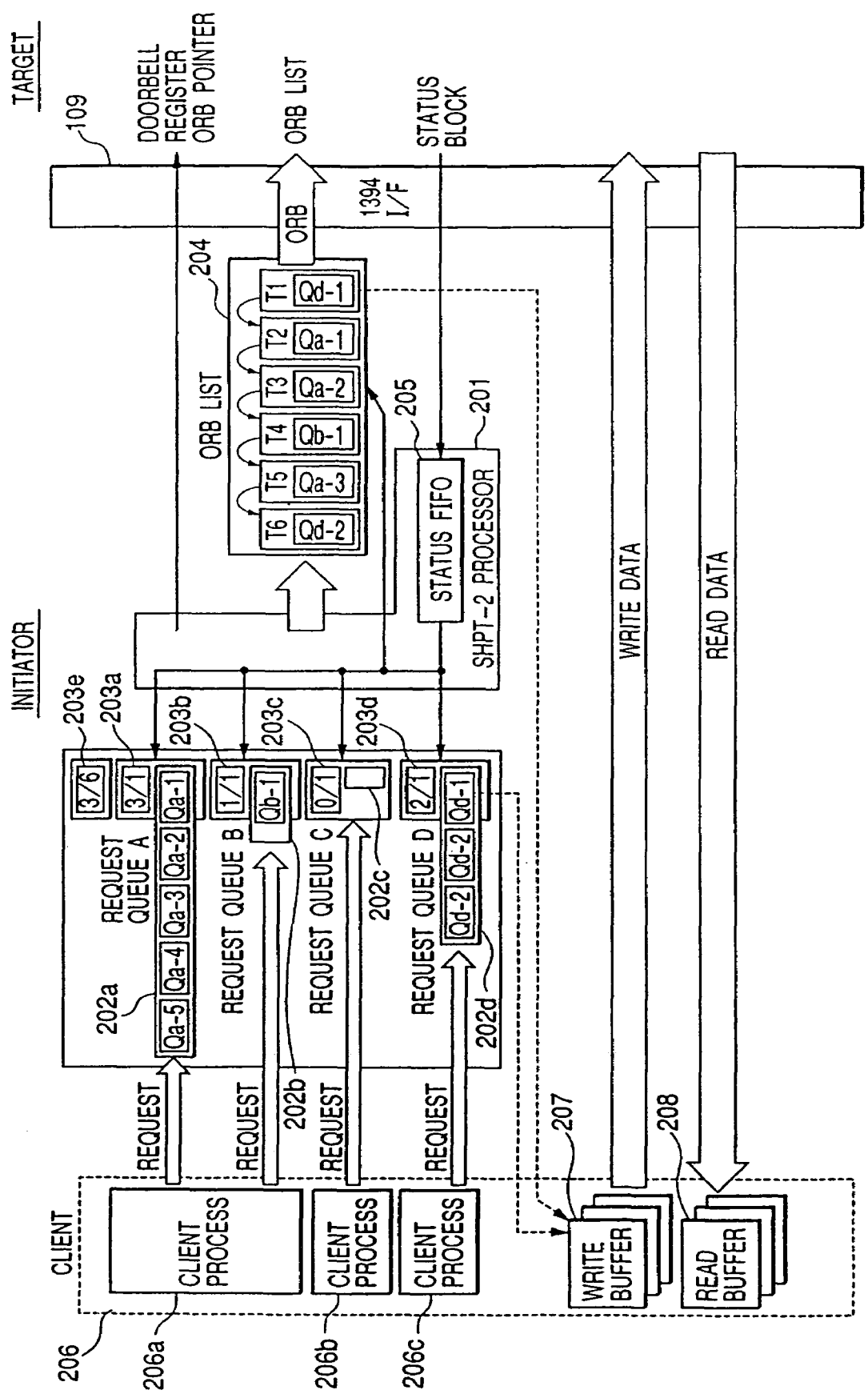
FIG. 2 is a block diagram of an initiator (host computer)

In the foregoing hardware construction, FIGS. 1 and 2 show communication systems in which the printer 100 is used as a target and the host computer 200 is used as an initiator. In the embodiment, those constructions are realized by executing programs by CPUs in the host computer and the printer, respectively. First, the initiator in FIG. 2 will be described.

In FIG. 2, in the host computer as an initiator, a client 206 such as a printer driver or the like issues a data transfer request for a printer through an SHPT-2 processor 201 and receives a response from the printer.

The SHPT-2 processor 201 manages I/O request queues and ORBs which are formed in the system memory. The client 206 comprises one or a plurality of client processes. The I/O request command from each client process is queued into each I/O request queue which is used for communication of each client process. Although four I/O request queues are shown as an example in the diagram, the number of I/O request queues is not limited to 4. The I/O request queue is dynamically prepared at the time of a connection of a communication of each client process. One or a plurality of I/O request queues are used for communication of each client process.

In the example shown in the diagram, two I/O request queues 202a and 202b are used for communication of a client process 206a. A write request command from the client process 206a is queued into the I/O request queue 202a. A read request command from the client process 206a is queued into the I/O request queue 202b. A state where an asynchronous full duplex communication is performed by those two I/O request queues is shown. Similarly, an I/O request queue 202c is used for communication of a client process 206b. A write request command is queued into the I/O request queue 202c and a unidirectional communication is performed. An I/O request queue 202d is used for communication of a client process 206c. A state where a synchronous semi duplex communication is performed by queueing one or both of the write request command and read request command into the I/O request queue 202d is shown.

ORB is a block in which an address, a size, and the like of a data buffer which are sent from the host computer as an initiator to the printer as a target or from the printer to the host computer have been stored. The blocks are sequentially linked to an ORB list 204 from the head ORB. With respect to the ORB, there are the following processing rules.

(1) ORBs are formed in order from a command extracted from the head of each I/O request queue and included to the end of the ORB list. The order of including the commands to the end of the ORB list is not particularly limited. It is also possible to allocate a priority order to each I/O request queue and allocate the command at the head of a specific I/O request queue preferentially to the end of the ORB list.

(2) The ORBs are sequentially fetched from the head of the ORB list. When a completion notice (status block) is received, the ORB corresponding to the status is removed from the ORB list.

(3) The upper limit of the number of ORBs which are linked is the same as a capacity (also including commands which are being processed as well) of a prefetch pool in a target, which will be explained hereinlater.

By the above items (1) and (2), it is guaranteed that the I/O request of each I/O request queue is issued to the target in generating order in each I/O request. By the above item (3), it is guaranteed that the I/O request in the ORB list is sent to the target. To realize the item (3), the SHPT-2 processor 201 prepares one counter for each request queue and one counter for the prefetch pool, respectively.

A counter for each I/O request queue is a counter called Current-QUE. In the example shown in the diagram, four Current-QUE counters 203a, 203b, 203c, and 203d are shown for four I/O request queues. In each Current-QUE counter, the number of reserved areas in the prefetch pool allocated to the respective I/O request queues is held in the denominator (right side). The number of commands (in the current ORB list) belonging to the I/O request queue is held in the numerator (left side).

The example in the diagram shows a state where the number of reserved areas in the prefetch pool allocated to the I/O request queues is equal to "1" and the numbers of commands (in the current ORB list) belonging to the I/O request queues 202a, 202b, 202c, and 202d are equal to "3", "1", "0", and "2", respectively.

A counter for the prefetch pool is a counter 203e called Current-POOL. The total number ("1+1+1+1"="4") of the numbers of reserved areas in the I/O request queues is subtracted from the total number "10" of areas in the prefetch pool and a resultant value "6" is set to the denominator (right side). This counter indicates the number of free areas in the prefetch pool other than the reserved areas allocated to the I/O request queues.

The number "3" of areas which can be lent to the request queues is set to the numerator (left side). Specifically speaking, among the values of the counters 203a to 203d in which the numerator is larger than the denominator, in this case, the values of (the numerator–the denominator), namely, (3−1=2, 2−1=1) of the counters 203a and 203d are calculated. A value "3" obtained by adding "2" and "1" calculated from the number "6" of free areas in the prefetch pool other than the reserved areas allocated to the I/O request queues is subtracted from "6" of the denominator. A resultant value "3" is set to the numerator.

The example in the diagram shows a state where the number of free areas in the prefetch pool other than the reserved areas allocated to the I/O request queues is equal to "6".

The total number of areas in the prefetch pool is held by the equipment as a target. This value is read out from the target at the time of login or the like and stored into the initiator.

The example in the diagram shows a state where the total number of areas in the prefetch pool is equal to "10". The number (in the current ORB list) in the Current-QUE counter associated with the I/O request queue is increased or decreased in accordance with the formation and deletion of the ORB.

Upon formation of the ORB, if the number (in the current ORB list) in the Current-QUE counter does not exceed the number of reserved areas in the prefetch pool allocated to the I/O request queues at the initial stage, the number in the Current-QUE counter is increased and the ORB is added into the ORB list. Otherwise, a check is made to see if the number in the Current-POOL counter is equal to or larger than "1". If it is equal to or larger than "1", the number in the Current-POOL counter is decreased, the number in the Current-QUE counter is increased, and the ORB is added into the ORB list. If the number in the Current-POOL counter is already equal to "0", the ORB is not added into the ORB list.

Upon deletion of the ORB, when the number (in the current ORB list) in the Current-QUE counter exceeds the number of reserved areas in the prefetch pool allocated to the I/O request queues at the initial stage, the number in the Current-POOL counter is increased. In any case, the number (in the current ORB list) in the Current-QUE counter is reduced.

When the ORB is formed, a predetermined value is written into a register called a doorbell register on the target side or the address of the ORB at the head of the list is written into a register called an ORB pointer, thereby notifying the target of the generation of the ORB. If the ORB has already been added to the end of the ORB list which is being executed by the target, the predetermined value is written into the doorbell register. When the head ORB is newly formed in a state without an ORB list, the address is written into the ORB pointer. This procedure is specified in SBP-2.

The SHPT-2 processor 201 includes a status FIFO 205.

The status received through a 1394 interface 109 is processed by the SHPT-2 processor 201. The SHPT-2 processor 201 removes the ORB corresponding to the received status from the ORB list 204 and removes the command corresponding to the removed ORB from the I/O request queue.

The host computer as an initiator has the functional construction as mentioned above.

<Construction of Target>

FIG. 1 is a block diagram showing a functional construction of the printer as a target. In FIG. 1, a doorbell register 101a is a register in which a value is written by the initiator and shows that the ORB has newly been formed. The address of the newly formed ORB is written into an ORB pointer 101b by the initiator. When the value is written into the doorbell register 101a, a fetch agent 101 reads out the ORB shown by the ORB pointer through the 1394 interface 109. An ORB dispatcher 102 extracts a pointer from a free reference list 104, stores the command of the ORB read by the fetch agent 101 into free areas (Fr-1 to Fr-4) in a prefetch pool 103 shown by the pointer, and connects the pointer to the end of the reference queue in accordance with a "QueueID" field, which will be explained hereinlater, of the relevant ORB.

The example in the diagram shows a state where four reference queues 105a, 105b, 105c, and 105d exist. The number of reference queues is not limited to 4. The reference queues are dynamically prepared when a communication of each client process is connected. One or a plurality of reference queues are used for communication of each client process.

An execution agent 106 fetches the commands queued into each reference queue from the head, performs the writing of data into the buffer of the initiator, the reading of the data from the buffer of the initiator, or the like in accordance with commands, and after that, returns a normal status to the host computer.

In the execution agent 106, one execution thread can independently schedule and execute the processes for all of the reference queues so as not to be blocked by the processes of the other reference queues, or the threads can be scheduled and executed by another execution thread every reference queue. Or, a combination of those executing methods can be used. The execution agent 106 writes the data into the buffer of the initiator designated by a read command in the prefetch pool which is referred to by the reference queue 105b in response to a data transfer request from a client process 108a such as a rasterizer or the like for interpreting, for example, a PDL and forming raster data. Since the data transfer request is generated asynchronously with a write command or a read command from the initiator, the initiator always queues the read command into the prefetch pool which is referred to by the reference queue 105b by the read command ORB. The target can send the data to the initiator any time so long as the read command is queued in the prefetch pool which is referred to by the reference queue 105b. A bus interface 110 is an interface for accessing from the printer 100 as a target to a desired memory location in a system memory 208 of the host computer 200 as an initiator. The constructions and operations of the initiator and target have been simply described above. The detailed contents of the ORB will be first explained prior to describing them further in detail.

<Contents of Command ORB (Operation Request Block)>

FIGS. 7A and 7B are diagrams showing a general construction of the ORB. In FIG. 7A, a "Next_ORB" (link) field 301 is a link to the next ORB.

When there is not the next ORB, a predetermined value showing the absence of the next ORB is inserted. The head ORB is shown by a predetermined address register.

A "data_descriptor" field 302 shows an address in a data buffer. A "d" (direction) field 303 shows a data transfer (0: write) from the host computer to the printer or a data transfer (1: read) from the printer to the host computer. A "data_size" field 304 indicates a size of data buffer shown by the address field 302. The fields (also including fields which are not described yet) locating above a dotted line in the diagram are the fields specified by SBP-2 and fields 305 to 308 which will be described from now on are fields which are used for processes peculiar to SHPT-2.

The "QueueID" field 305 indicates an ID of a reference queue which is used. The "function" field 306 indicates a kind of ORB as shown in FIG. 7B. 0H indicates the write command. 40H indicates the read command.

The "seq_ID" (sequence ID) field 308 indicates a sequential identifier which is allocated every reference queue in forming order of the ORBs. In the embodiment, the identifier is given so as to increase each time the ORB is formed.

After the "seq_ID" field increases to the maximum value, it is returned to "0" in the next increase. A counter which gives a value to the sequence ID field and serves as a reference is provided in a region where it is not influenced by the bus reset or another obstacle. This is because the processes are performed in the target while increase performance of the sequence ID is used as a prerequisite. Various values are inputted into a control block field 309 in accordance with the value in the function field 306 or a function which is realized by the target for each function. The address and size of the buffer are obtained at the time of formation of the ORB from the command inputted in the I/O request queue.

The contents of the ORB will now be described every function.

(Write Command ORB)

Figure 8:
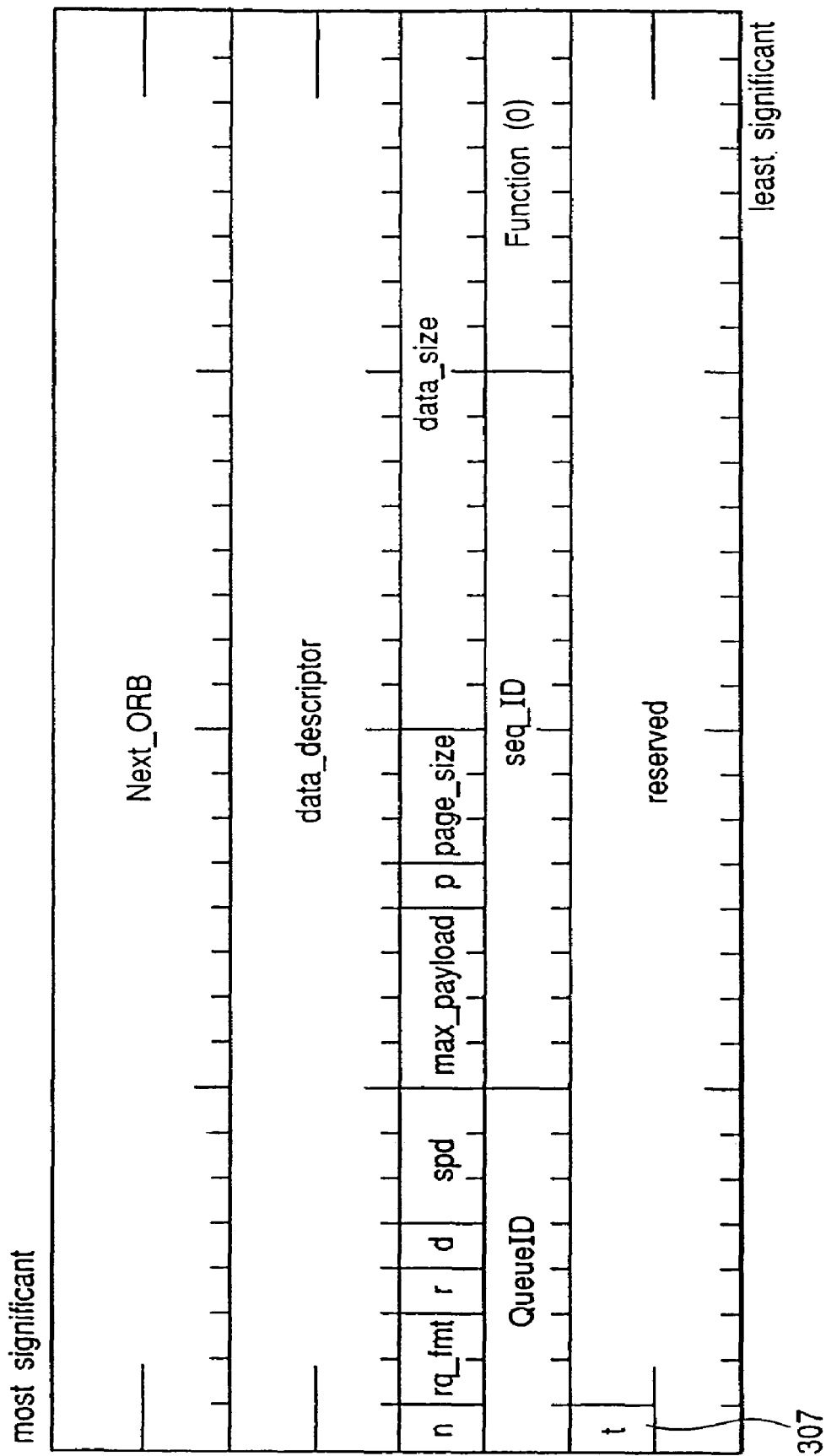
FIG. 8 is a diagram showing a format of a write command ORB.

FIG. 8 shows a write command ORB of a function=0H.

This command is a command to send the data in the designated buffer from the initiator to the target. A value in the function field is equal to "0H". The "t" (tag) bit 307 shows a data tag.

(Read Command ORB)

Figure 9:
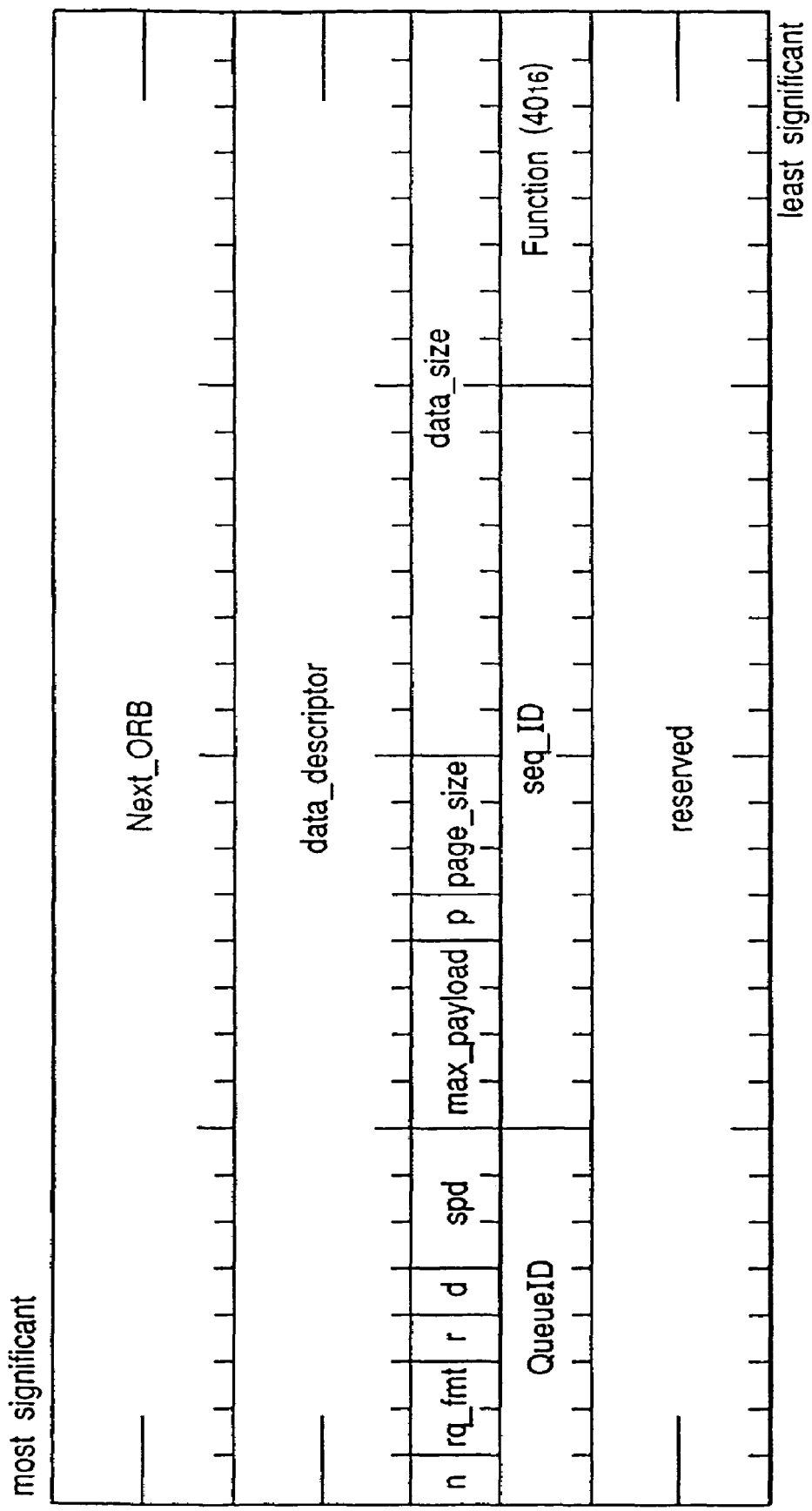
FIG. 9 is a diagram showing a format of a read command ORB.

FIG. 9 shows a read command ORB of the function=40H.

This command is a command to read out the data from the target by the initiator. A value in the function field is equal to 40H.

(Connection Command ORB)

Figure 10:
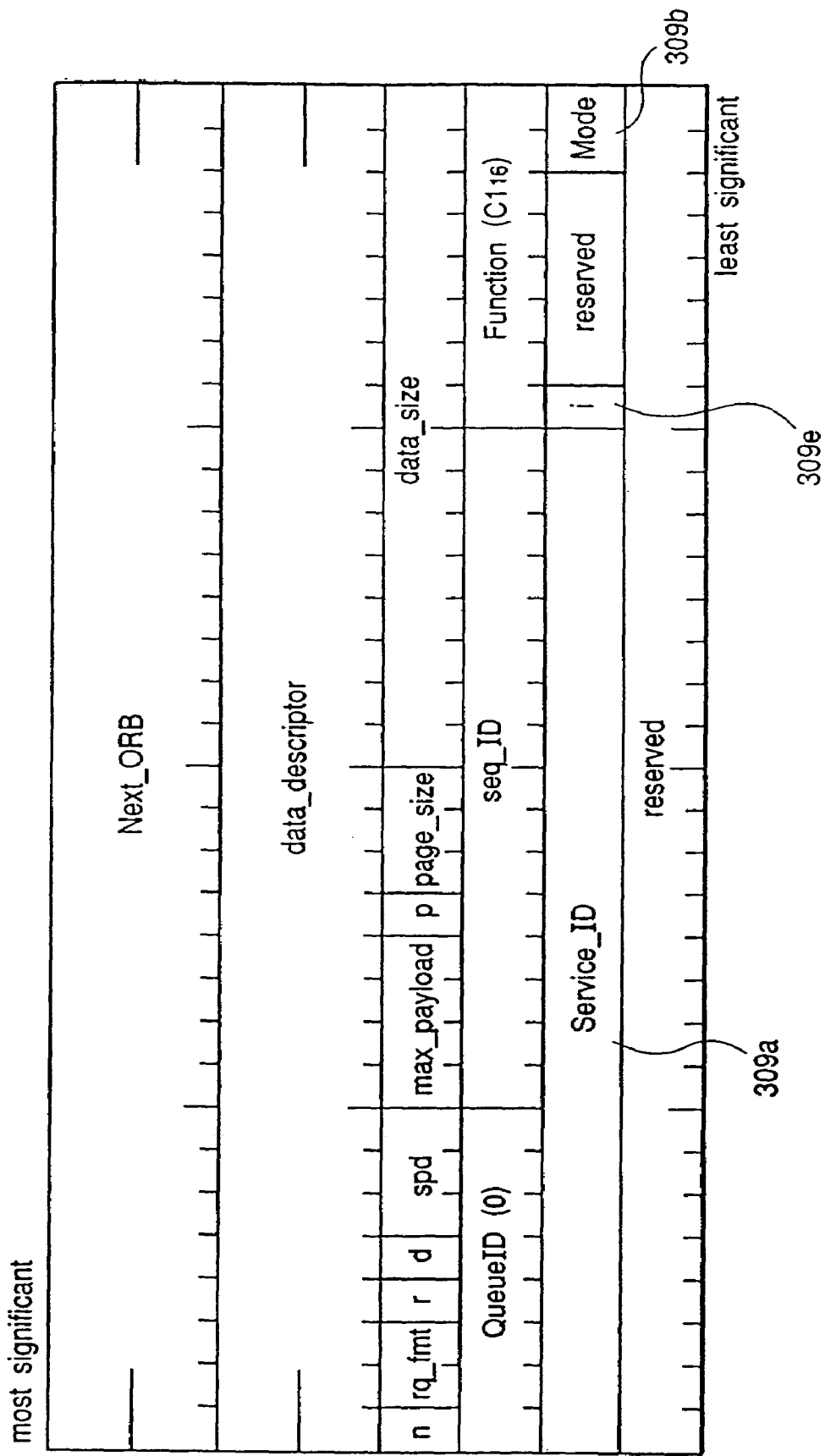
FIG. 10 is a diagram showing a format of a connection command ORB.

FIG. 10 shows a connection command ORB of the function=C1H. This command is issued for a reference queue for a connection service in which "QueueID"=0 and used to open a new connection and obtain an ID of a reference queue which is used for such connection. An ID of a service of a new connection destination is designated in a "Service_ID" field 309a. Information indicating that to which one of the full duplex bidirection, unidirection, and semi duplex bidirection the connection is set is designated in a "Mode" field 309b.

An "i" bit 309e is set to 1 when the initiator requests an increase in the prefetch pool to the target.

(Disconnection Command ORB)

Figure 11:
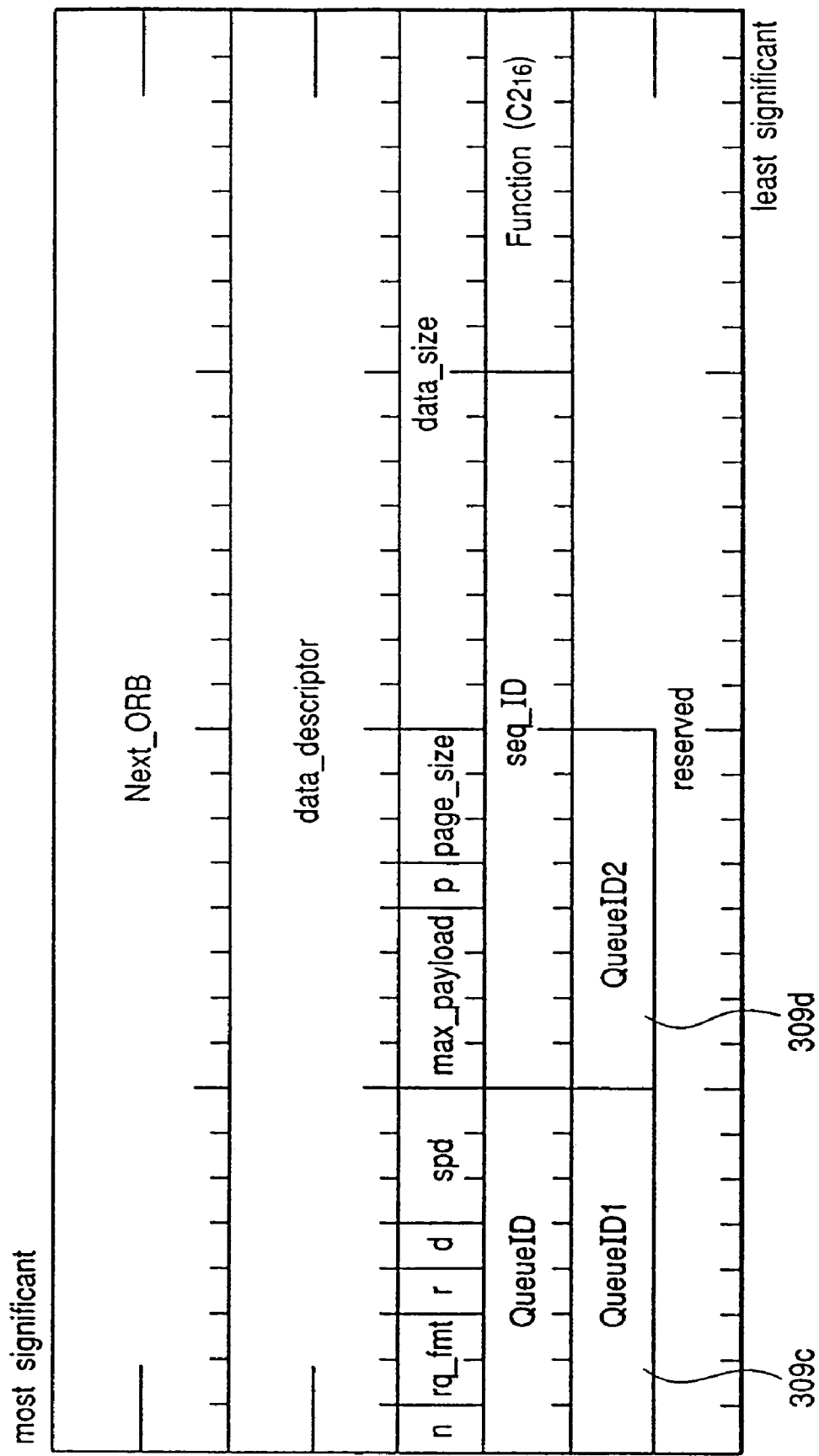
FIG. 11 is a diagram showing a format of a disconnection command ORB.

FIG. 11 shows a disconnection command ORB of the function=C2H. This command is used to close the connection opened by the connection command ORB. This command can be issued for the reference queue to be closed or can be issued for a reference queue for a connection service in which "QueueID"=0. When this command is issued for a reference queue for a connection service in which "QueueID"=0, the connection for the reference queues designated by "QueueID1" field 309c and "QueueID2" field 309d is closed. When only one reference queue is used for connection, 0 is designated in the "QueueID2" field.

(Query Command ORB)

Figure 12:
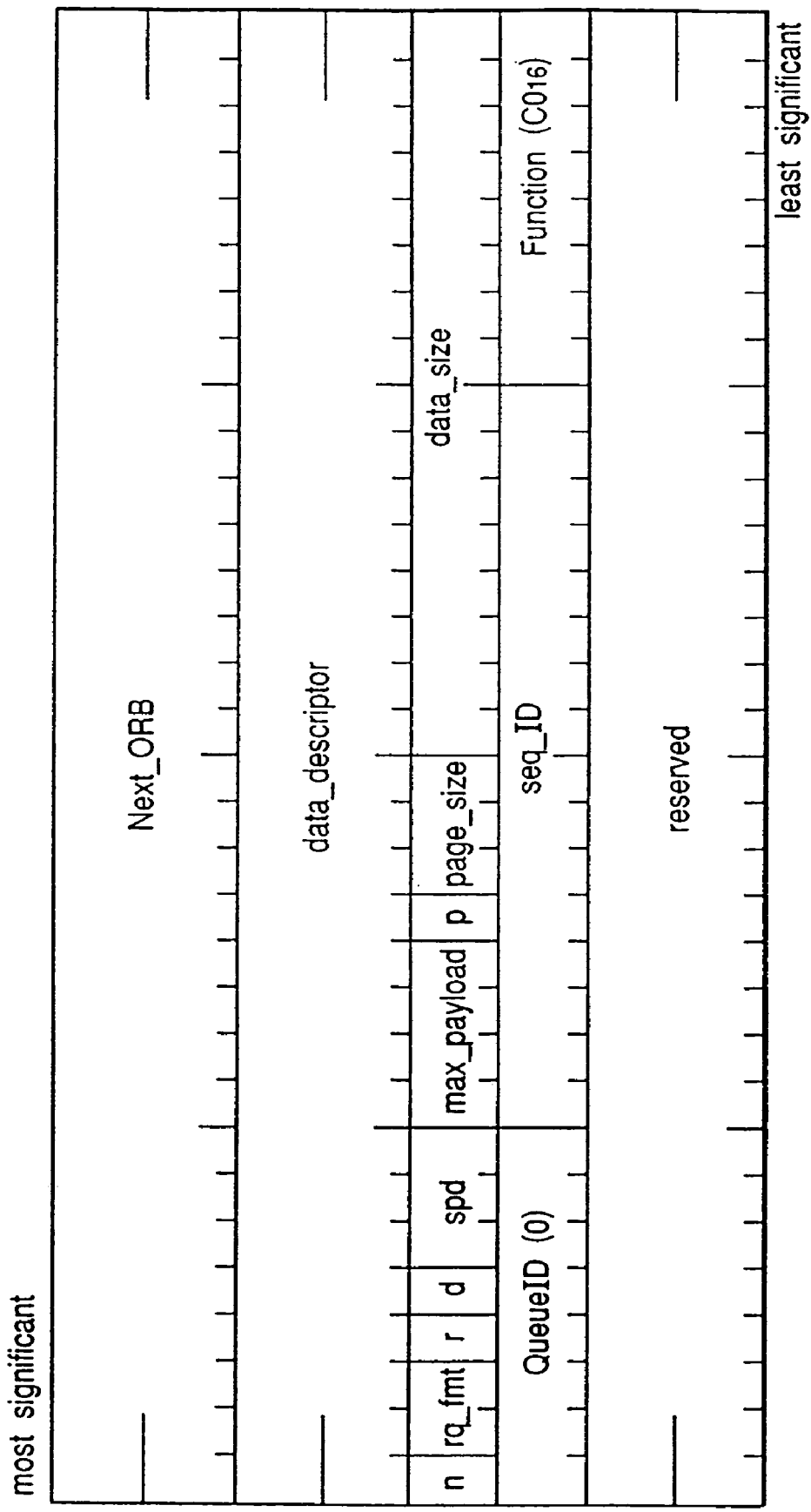
FIG. 12 is a diagram showing a format of a query command ORB.

FIG. 12 shows a query command ORB of the function=C0H. This command is used to get a capacity of the prefetch pool from the target prior to the communication after the login.

(Status Block)

Figure 13:
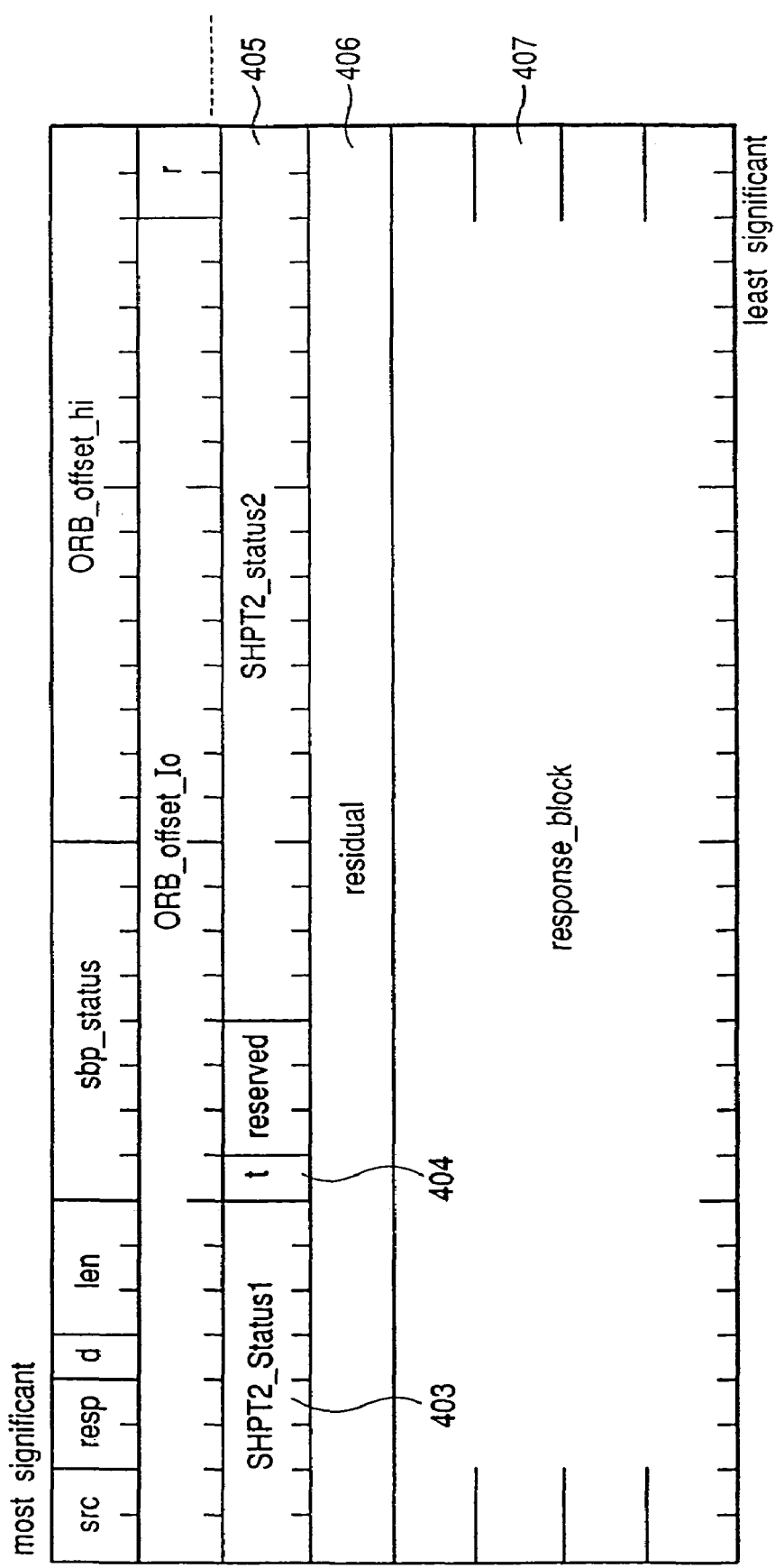
FIG. 13 is a diagram showing a general format of a status block.

FIG. 13 shows a format and contents of a status which is returned from the target to the initiator. In FIG. 13, since the fields locating above a dotted line are the fields specified by SBP-2, they are not described in particular. A tag field 404 shows a data tag and is valid only in the status for the read command ORB.

"SHPT2_status1" and "SHPT2_status2" (SHPT-2 status) fields are fields showing an execution result status of the command ORB and indicate an error when they are other than 0. That is, when the value is equal to 0, this means that the processes with respect to the command ORB corresponding to such a status have been completed. For example, when the corresponding command ORB is the write command, this means that as for the status block in which the SHPT-2 status is equal to 0, the target reads out all of the data from the buffer indicated by the corresponding write command ORB and finishes the writing into the buffer which the target has. When the value is other than 0, this means that a part or all of the processes of the corresponding command ORB are not performed due to the error. The initiator which received this error copes with the error by notifying the client of the occurrence of the error, or the like.

A "residual" (remain) field 406 shows a residual data length excluding a length of data processed for the buffer indicated by the ORB.

(Connection Status Block)

Figure 14:
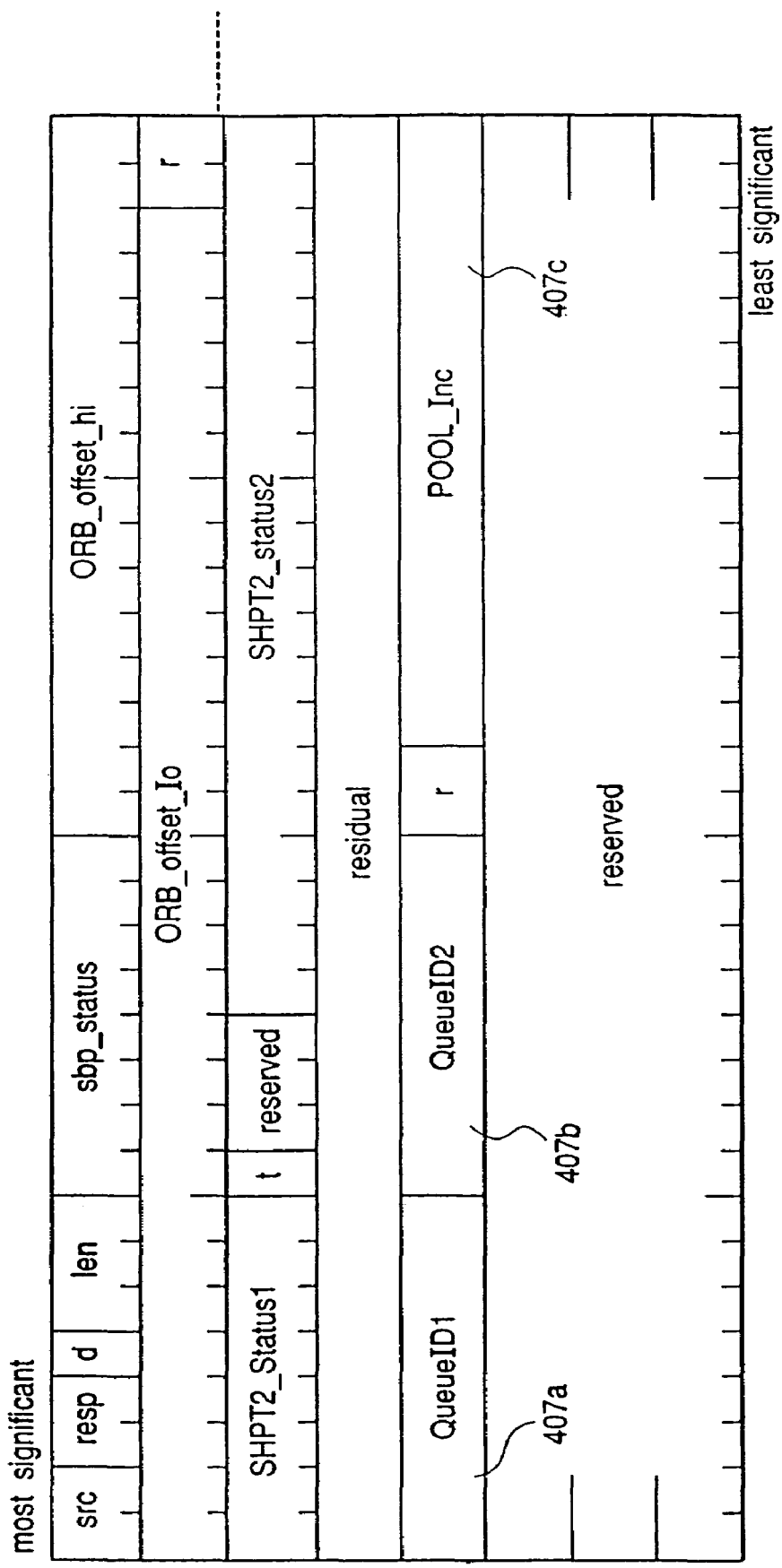
FIG. 14 is a diagram showing a format of a connection status block.

FIG. 14 shows a status block for the connection command ORB of the function=C1H. This block is sent from the target to the initiator when the connection command is finished. The IDs of the reference queues which are used for new connection are shown in a "QueueID1" field 407a and a "QueueID2" field 407b. When a "Mode" field of the connection command ORB indicates the unidirection, 0 is returned to "QueueID2". In case of the semi duplex, the same ID is returned to "QueueID1" and "QueueID2". In case of the bidirection, different IDs are returned to "QueueID1" and "QueueID2". A "POOL_Inc" field 407c indicates an increase amount of the capacity of the prefetch pool of the target.

(Query Status Block)

Figure 15:
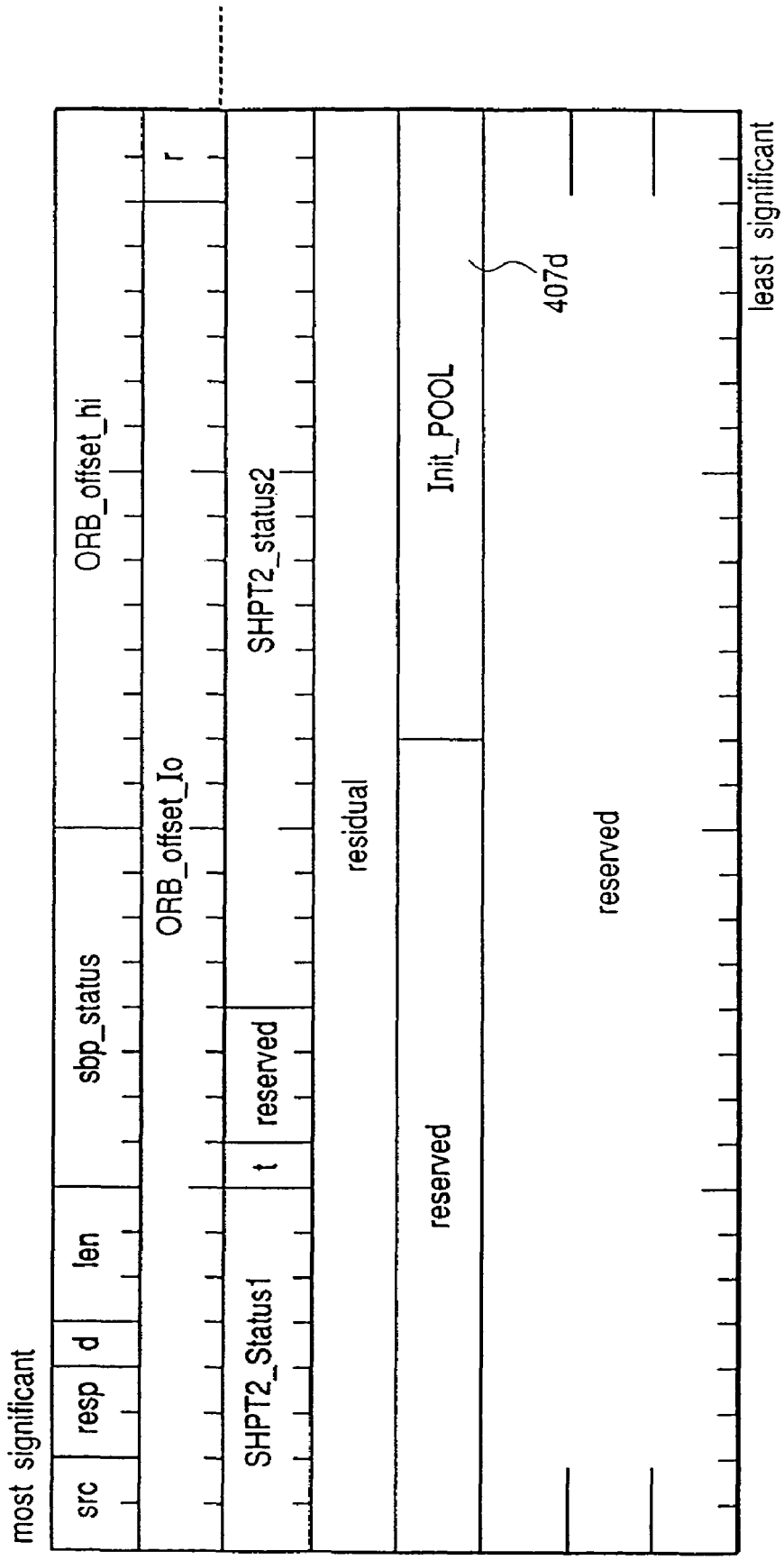
FIG. 15 is a diagram showing a format of a query status block.

FIG. 15 is a status block for the query command ORB of the function=C0H. This block is sent from the target to the initiator when the query command is finished. The capacity of the prefetch pool of the target is returned to an "Init_POOL" field 407d.

<Management of ORB>

How the ORB is used will now be described on the basis of the constructions of the initiator and target described above and the constructions of the command ORB and status block.

A flow of commands among the initiator, target, and clients will now be described with reference to FIGS. 1 and 2. Explanation will now be made on the assumption that the request queue A 202a and reference queue A 105a are used for the data transfer from the initiator side to the target side and the request queue B 202b and reference queue B 105b are used for the data transfer from the target side to the initiator side.

When a data transfer request from the client of the initiator is issued, the client includes the write command including the address and size of the buffer in which the data to be sent to the target has been stored to the end of the I/O request queue A 202a.

In the SHPT-2 processor 201, a check is made to see if the number of commands (in the current ORB list) belonging to the I/O request queue shown by the Current-QUE counter 203a is equal to or larger than the number of reserved areas in the prefetch pool allocated to the I/O request queue. If it is equal to or less than the number of reserved areas, an ORB is formed from the write command and linked to the end of the ORB list 204. The number of commands (in the current ORB list) belonging to the I/O request queue shown by the Current-QUE counter 203a is increased by 1. If the number in the ORB list is equal to or larger than the number of reserved areas, the Current-POOL counter 203e is checked. If there is a free area, namely, if the count value of the counter 203e is not equal to 0, an ORB is formed from the write command and linked to the end of the ORB list 204. The number of commands (in the current ORB list) belonging to the I/O request queue shown by the Current-QUE counter 203a is increased by 1 and the value of the Current-POOL counter is decreased by 1.

The Current-POOL counter 203e is checked and if there is no free area, the apparatus waits for the free area. In the state of FIG. 2, three ORBs have already been linked from the request queue A and this number is larger than the number 1 of reserved areas. However, since the value of the Current-POOL counter is equal to 3, the value in the Current-POOL counter is reduced to 2 and the number in the ORB list of the Current-QUE counter is increased to 4. The ORB for a writing request Qa-4 which waited in the request queue can be added into the ORB list. Even if the ORB is formed, the write command corresponding thereto is not deleted from the I/O request queue but deleted at a point when a completion status is received from the target.

When the ORB is inserted into the ORB list, the SHPT-2 processor 201 writes it into the doorbell register 101a of the target through the 1394 interface or writes an address of a new ORB into the ORB pointer The dispatcher 102 extracts a pointer from the free reference list 104, stores a command of the ORB into a free area in the prefetch pool 103 indicated by the pointer, and connects the pointer to the end of the reference queue in accordance with a QueueID field (in this case, it indicates the reference queue A 105a) of the relevant ORB. The execution agent 106 sequentially executes the commands in the prefetch pool that is referred to by the reference queue. That is, the contents in the buffer shown by the write command are written into the buffer prepared by the client of the target. When the process of the command is completed, the execution agent writes the status block in which the SHPT-2 status indicates "completion" into the status FIFO 205 of the initiator.

The SHPT-2 processor 201 processes the status blocks written into the status FIFO from the head. That is, if the SHPT-2 status indicates "completion", the ORB corresponding to the status block is removed from the ORB list and, at the same time, the corresponding write command in the I/O request queue is deleted. In this instance, a check is made to see if the number of commands (in the current ORB list) belonging to the I/O request queue shown by the Current-QUE counter 203a exceeds the number of reserved areas in the prefetch pool allocated to the I/O request queue. If NO, the number of commands (in the current ORB list) shown by the Current-QUE counter 203a is reduced by 1. When the number of commands in the ORB list exceeds the number of reserved areas, the count value of the Current-POOL counter 203e is increased by 1. The number of commands (in the current ORB list) shown by the Current-QUE counter 203a is decreased by 1.

The above procedure is substantially similar to that of the read command. However, the read command is not processed so long as the data to be read out is not generated in the target. Therefore, the read command ORB issued from the initiator is stored into the prefetch pool 103 and queued and held in the reference queue B 105b until the data to be read out is generated.

When the initiator is the host computer and the target is the printer, to send the print data from the host computer to the printer, it is sent from a printer driver as a client of the initiator to the rasterizer as a client of the target by using the write command. When the host computer requests information showing the construction and status of the printer, a command (command at the client level) indicative of such a fact is transmitted as a write command to the printer. The (client of the) printer which received the write command sends the requested data to the host computer by using the read command stored in the prefetch pool and queued in the reference queue. Further, in a case such that an error occurs in the printer, the client of the printer can spontaneously send error information to the host computer by using the read command stored in the prefetch pool and queued in the reference queue. Therefore, while the host computer is connected to the printer, it issues at least one read ORB to the printer for the purpose of operation. Further, to always allow the read command to be stored in the prefetch pool and queued in the reference queue, it is desirable to issue at least two read ORBs to the printer.

As for the ORB list 204 in FIG. 2, the ORBs are not always sequentially deleted from the head. For example, there is also a case where ORB T4 (command Qb-1) directed to the reference queue B 105*b* is completed and deleted prior to ORB T3 (command Qa-2) directed to the reference queue A 105*a*. Therefore, there is no link destination of ORB T3 (command Qa-2). In this case, since the pointers to ORB T3 (command Qa-2) and ORB T5 (command Qa-3) have already been sent to the target at the time of processing of ORB T4 (command Qb-1), there is no need to re-connect the link destination on the ORB list. Even if the ORB list is cleared due to an error or the like, since the corresponding command remains in the I/O request queue, an error recovering process, which will be explained hereinlater, can be also normally performed.

<Recovery (Initiator) of Error>

As already described above, in SBP-2, the connection between the initiator and the target is disconnected by the bus reset due to an abnormality (error) on the network. Therefore, in SHPT-2, a procedure to recover the status lost by the bus reset is determined.

When the bus resetting process is finished after the bus reset occurred due to an error or the like on the network, the initiator deletes all of the ORBs from the ORB list in accordance with the regulations of SBP-2. Each I/O request queue is not reset even if the bus reset occurred.

After the connection is reset, the initiator newly forms an ORB from the contents of those queues with reference to the I/O request queue and issues it to the target. In this instance, by designating again the value in the "Seq_ID" field allocated to the corresponding command at the time of formation of the ORB, the status just before the bus reset can be reconstructed.

<Recovery (Target) of Error>

Although the initiator can return the status to the status just before the bus reset merely by recovering the ORB list, since the target performs the reading/writing operation for the buffer in response to the read/write command, if the bus reset occurs during the reading/writing operation, its procedure has to be continued after the recovery. Therefore, the execution agent of the target stores the "Seq_ID" field of the command which is referred to by each reference queue and is being processed and the position in the buffer during the process every reference queue.

For example, in the case where the initiator issues the read ORB and the target processes it by the execution agent, the execution agent 106 reads out the "Seq_ID" field of the read command ORB which is processed from now on before the execution and stores it as a sequence identifier (Sequenceidentifier). When data is written into the buffer of the client, the address in the buffer in which data is being written at present is continuously updated as an execution pointer (Nextexecpointer). Those areas are assured in the memory area which is not erased by the bus reset.

Since the initiator issues an ORB again after completion of the bus reset, if the "Seq_ID" field of the ORB which has been stored in the prefetch pool and is referred to at the head of the reference queue is older than the stored sequence identifier, the process of this ORB has already been completed, so that the execution agent returns the completion status. If both of them coincide, the writing operation is continued from the address indicated by Nextexecpointer.

The recovery is also similarly performed with respect to the write command.

The command and status which are used in the printing system of the embodiment have been described above. A processing procedure of the command and status in the initiator and target will now be described.

<Data Transfer Request by Client of Initiator>

Figure 3:
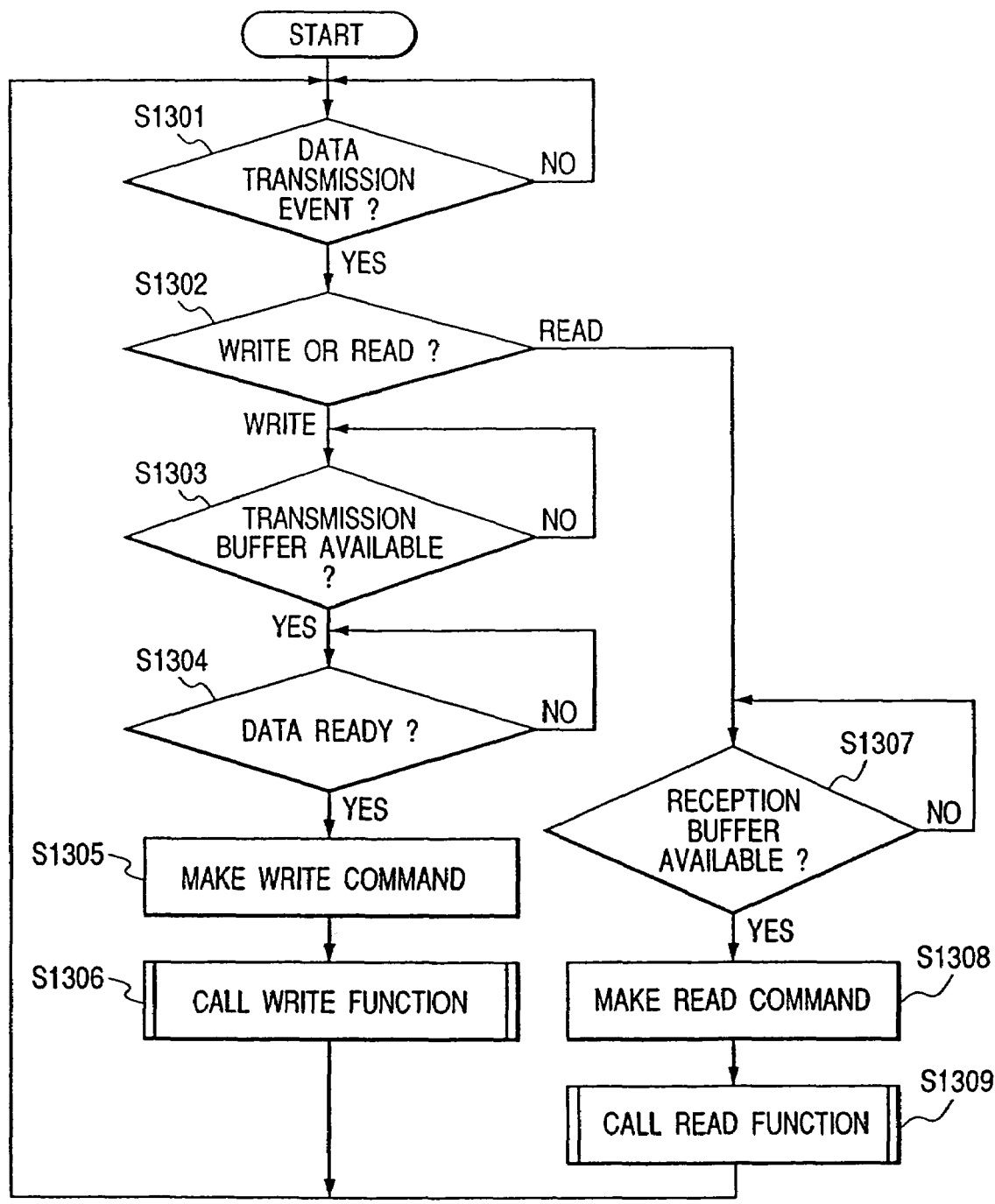
FIG. 3 is a flowchart for a processing procedure when a data transfer request is generated by a client of the initiator.

FIG. 3 shows a procedure when data is transmitted or requested to the target from a printer driver or the like as a client of the initiator.

When a data transmission event occurs (step S1301), whether the command which is necessary for it is the write command or the read command is discriminated (step S1302). If it is the write command, whether there is a data transfer buffer for it or not is discriminated (step S1303). Whether the transmission data to be sent to the target has been prepared or not is discriminated (step S1304). If all of them have been prepared, the write command is formed by giving necessary arguments such as address, size, and the like of the buffer (step S1305). A write function is called (step S1306).

If it is determined that the necessary command is the read command, whether there is a transfer buffer to receive the data is discriminated (step S1307). If YES, the read command is formed by sending the necessary arguments such as address, size, and the like of the buffer (step S1308). The read function is called (step S1309).

For example, when the data transmission event is a transmission of the print data to the printer, a command at the client level and data such as a PDL are prepared in the buffer and the write command is formed. If the data transmission event is the reading operation to read out the status from the printer, a command at the client level indicative of such a fact is prepared and the write command is formed. At the same time, it is necessary to form the read command to receive data from the target. Prior to performing a series of data exchange with the target, the client of the initiator issues several read commands.

Figure 4:
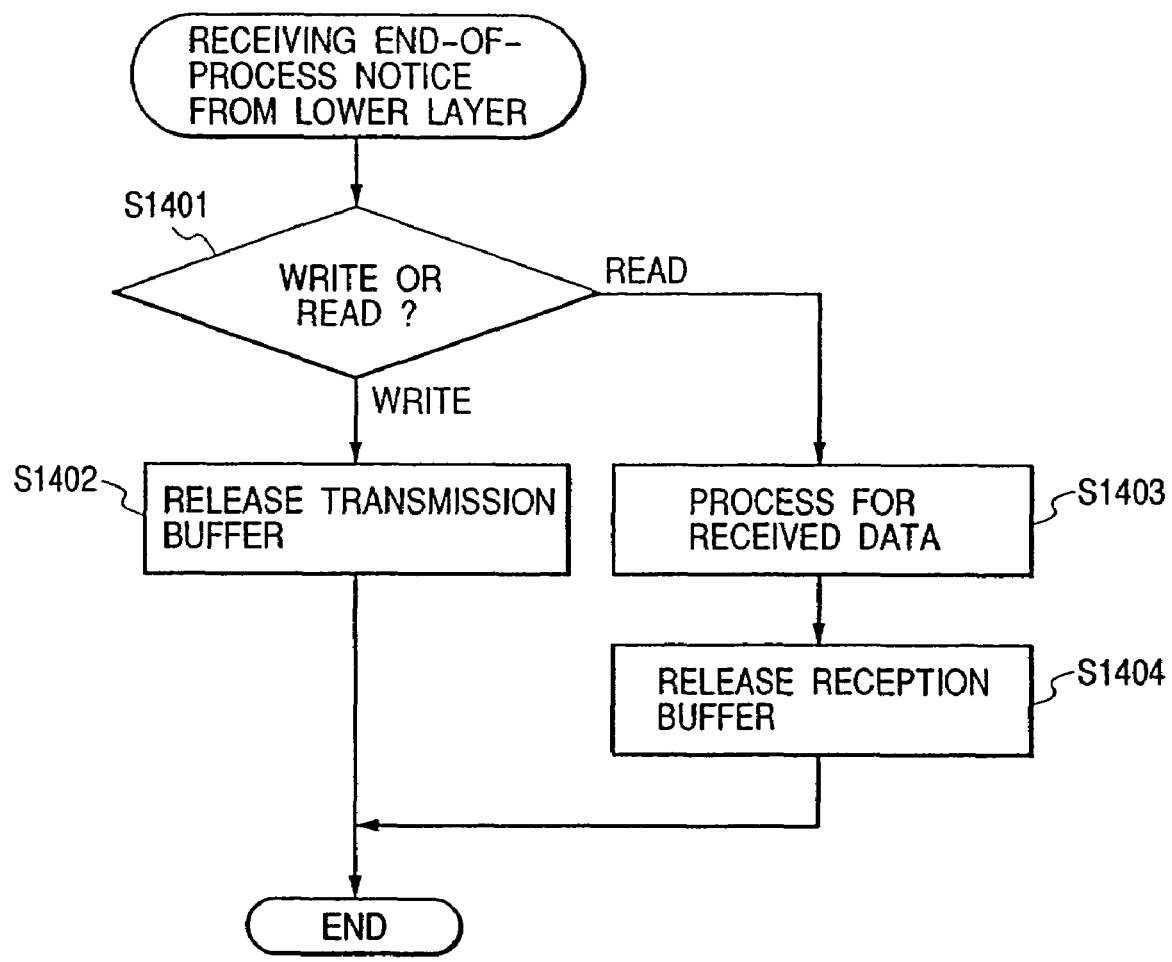
FIG. 4 is a flowchart for a processing procedure when an end-of-process notice is received from SHPT-2 by the client of the initiator.

FIG. 4 shows a processing procedure when the client of the initiator receives an end-of-process notice from a lower layer, namely, the layer of SHPT-2. First, whether the finished process is the reading process or the writing process is discriminated (step S1401). If it is the writing process, the used data buffer is released (step S1402). If it is the reading process, since the end of the process denotes the completion of the data reception, the process corresponding to the received data is performed (step S1403). The data buffer is released (step S1404).

<Process by SHPT-2 Processor of Initiator>

FIGS. 5A to 5C and 6 show processing procedures by the SHPT-2 processor of the initiator.

Figure 5A:
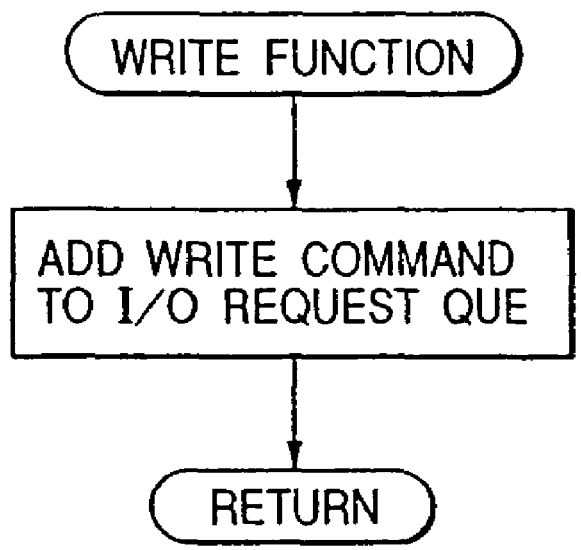
FIGS. 5A, 5B and 5C are flowcharts for a write function and a read function which are executed by an SHPT-2 processor of the initiator and called from the client and a flowchart for a managing procedure of an I/O request queue which is executed by the SHPT-2 processor of the initiator.
Figure 5B:
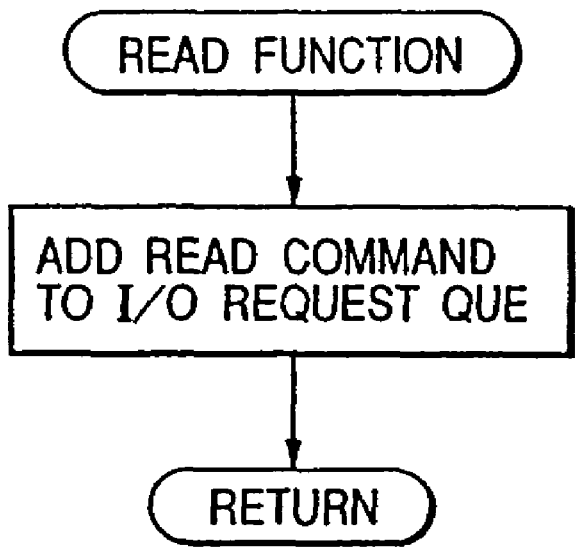

FIGS. 5A and 5B show the contents of a write function and a read function which are called by the client, respectively. In the write function, when the client issues a connecting request and is connected, a connection handle given by the SHPT-2 processor is sent as an argument to the client, and on the basis of the ID of the I/O request queue corresponding to the connection handle, the write command is added into the I/O request queue. In the read function as well, in a manner similar to the above, when the client issues a connecting request and is connected, the connection handle given by the SHPT-2 processor is sent as an argument to the client. On the basis of the ID of the I/O request queue corresponding to the connection handle, the read command is added into the I/O request queue. The commands queued in the I/O request queues respectively are, after that, sent to the reference queues shown by "QueueID1" and "QueueID2" given by the statuses of the connection command on the target side, respectively.

(I/O Request Queue Management)

Figure 5C:
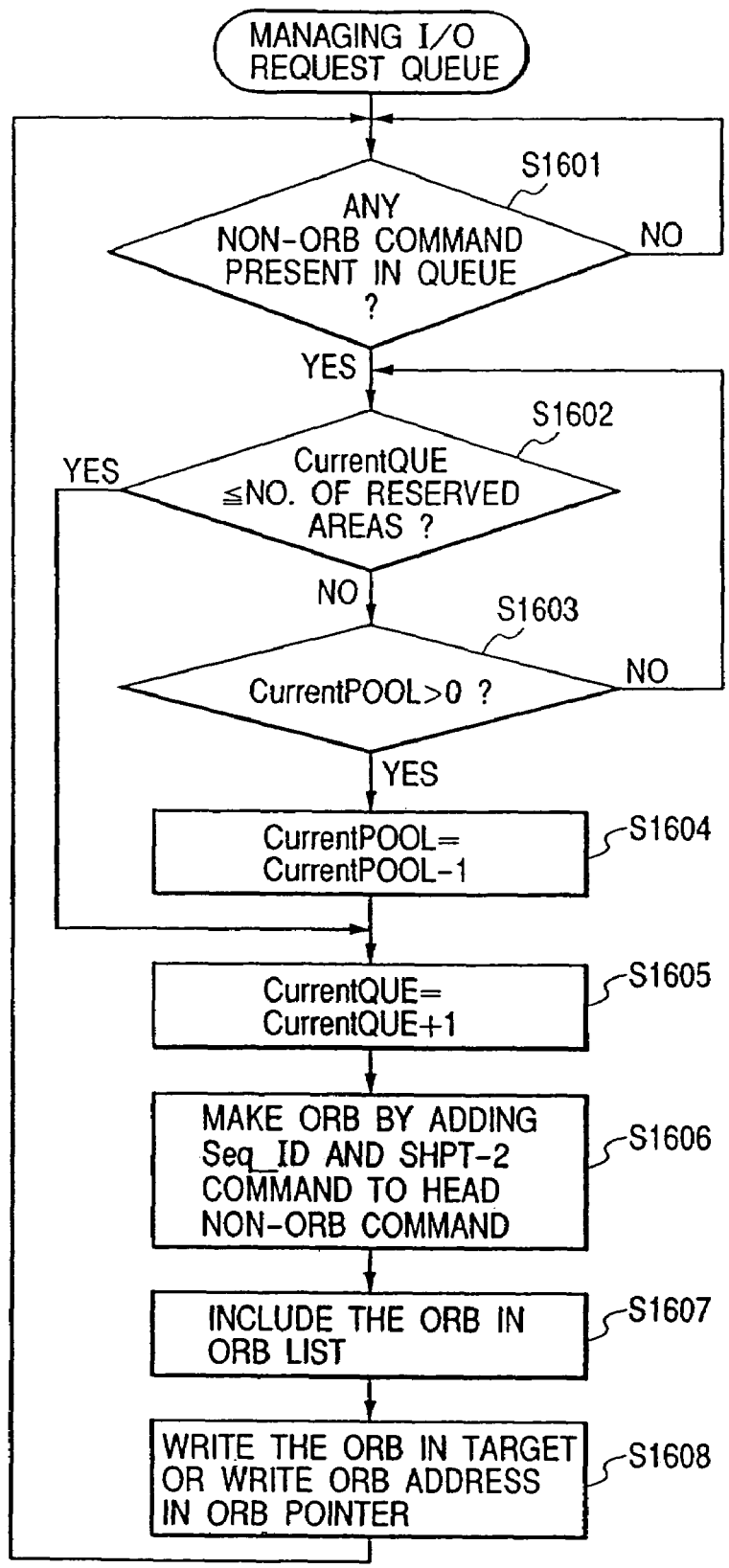

FIG. 5C shows a managing procedure of each I/O request queue. Those procedures can be independently performed by a thread schedule by one thread in each I/O request queue. Or, all of the I/O request queues can be executed in a single thread by independently scheduling them in a manner such that the management of one I/O request queue is not blocked by the operations of the other I/O request queues. Or, a combination of those methods can be also used. FIG. 5C shows a management of one I/O request queue. The management of the I/O request queue is performed every I/O request queue.

First, whether there is a non-ORB command in the I/O request queue or not is discriminated (step S1601). If YES, a check is made to see if the count value of the Current-QUE counter showing the number of commands (in the current ORB list) belonging to the I/O request queue is smaller than the number of reserved areas in the prefetch pool allocated to the I/O request queue (step S1602). If YES, step S1605 follows. If the count value is equal to or larger than the number of reserved areas, step S1604 follows. In step S1604, the count value of the Current-POOL counter is decreased by 1 if the count value of the Current-POOL counter for the prefetch pool is larger than 0 (step S1603). Subsequently, 1 is added to the count value of the Current-QUE counter (step S1605). An ORB is formed by adding the sequence ID (Seq_ID) and SHPT-2 command (Function) on the basis of the non-ORB command at the head stored in the I/O request queue (step S1606).

The ORB formed in this manner is included into the ORB list (step S1607) and written into the doorbell of the target or the address of the ORB is written into the ORB pointer (step S1608). In this manner, the ORB is formed from the command in the I/O request queue.

(Process for Status Block)

FIG. 6 shows a processing procedure when the status block is received from the target. When the status block of the process completion for the ORB is received, the corresponding ORB is deleted from the ORB list (step S1701). The I/O request queue in which the command for the corresponding ORB has been queued is selected (step S1702). Whether the count value of the Current-QUE counter showing the number of commands (in the current ORB list) belonging to the selected I/O request queue is equal to or less than the number of reserved areas in the prefetch pool allocated to the I/O request queue or not is discriminated (step S1703). If the count value is equal to or less than the number of reserved areas, step S1704 follows. If it is larger than the number of reserved areas, step S1705 follows. In step S1704, the count value of the Current-POOL counter for the prefetch pool is increased by 1. In step S1705, subsequently, the count value of the Current-QUE counter showing the number of commands (in the current ORB list) belonging to the selected I/O request queue is decreased by 1. Finally, the end of process is notified to the client corresponding to the selected I/O request queue (step S1706). The client receives this notice and executes the processes of FIG. 4.

(Error Recovering Process)

The ordinary processes in the SHPT-2 processor have been mentioned above. A procedure for recovering after the bus reset or the like will now be described with reference to FIG. 18. When the bus reset occurs and the connection between the target and the SBP-2 connection is disconnected, the connection of SBP-2 has to be newly reset.

First, a linking process of the new ORB is intermitted (step S1801) and the ORB-list is cancelled (step S1802). After that, a re-connection command of the SBP-2 connection is issued (step S1803) and whether the connection has been established or not is discriminated (step S1804). If the connection is established again, the corresponding ORB is sequentially formed from the command at the head in each I/O request queue (step S1805). In this instance, the same ID as that added to the command before the bus reset is given to the "Seq_ID" field of each ORB. The formed ORB is linked to the ORB list (step S1806). The address is written into the ORB pointer (step S1807), thereby notifying the target of the generation of the ORB.

When a predetermined time elapses in a state where the connection cannot be established again (step S1808), all of the commands in each I/O request queue are cancelled (step S1809) and an error is informed to the client (step S1810). The processing routine is finished. By the above procedure, the SBP-2 connection with the target is newly established after the reset and the ORB list just before the reset can be recovered.

<Processes by Target>

Figure 19:
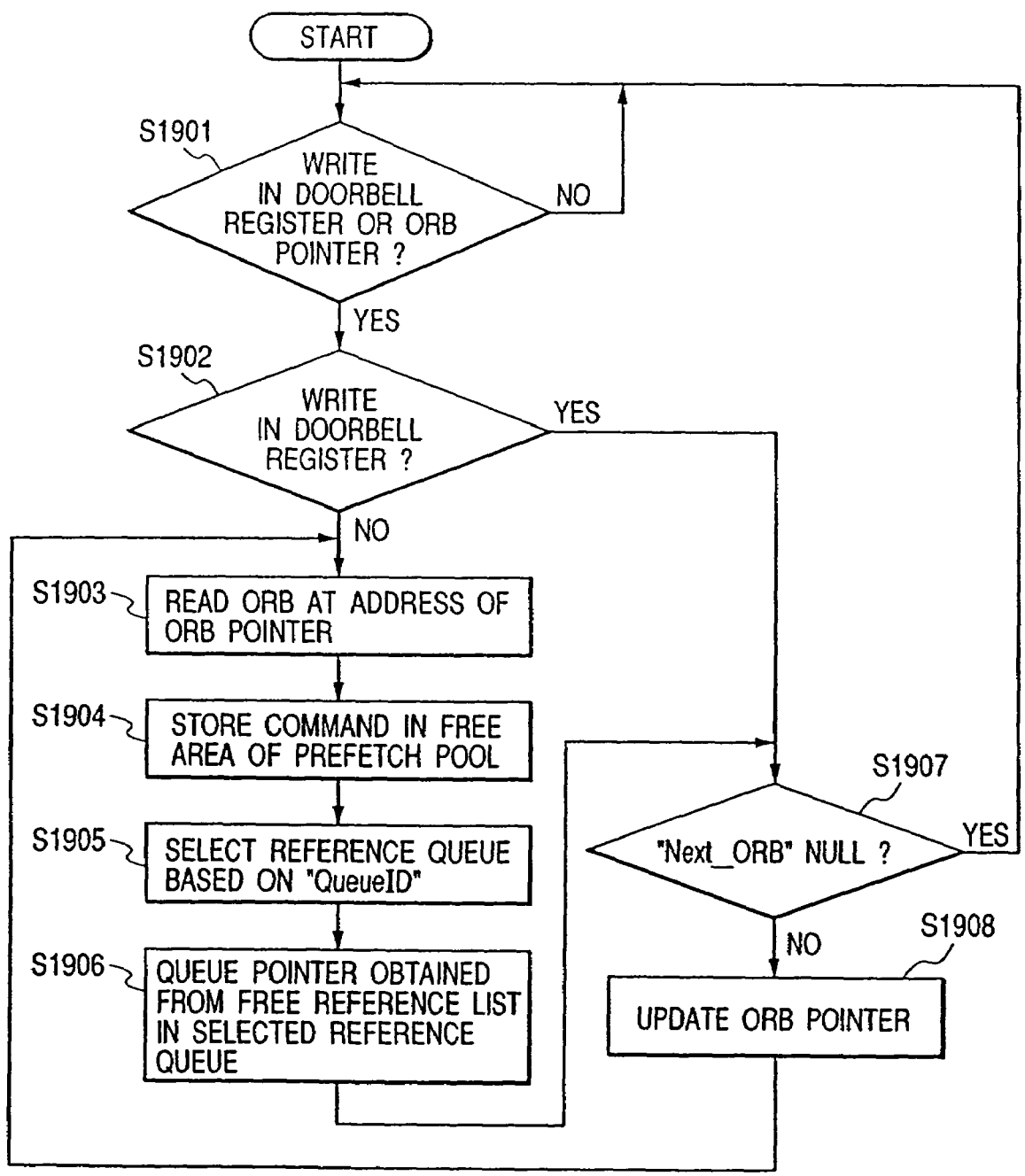
FIG. 19 is a flowchart for a processing procedure which is executed by a fetch agent of the target when writing is performed to a doorbell register or an ORB pointer.
Figure 20:
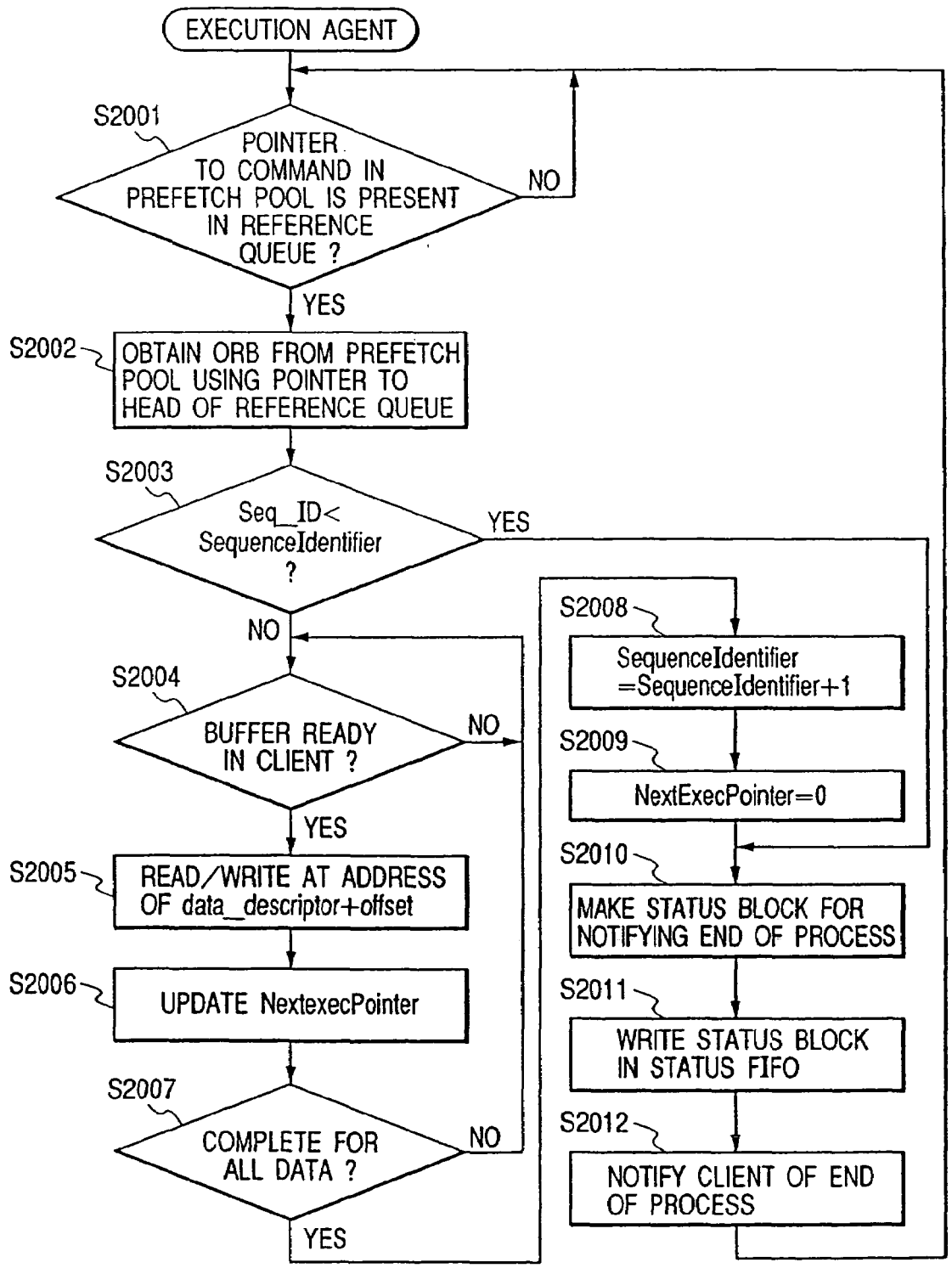
FIG. 20 is a flowchart for a processing procedure which is executed by an execution agent of the target.

FIGS. 19 and 20 show processing procedures by the target which received the ORB.

(Processes by the Fetch Agent)

One fetch agent is prepared for one SBP-2connection. The fetch agent fetches the ORB when the writing operation is performed to the doorbell register or ORB pointer. First, the apparatus waits until the writing operation is performed to the doorbell register or ORB pointer (step S1901). When it is done, a check is made to see if the apparatus has been activated by the writing to the doorbell register (step S1902). If the apparatus is activated by the writing to the ORB pointer instead of the writing to the doorbell register, step S1903 follows. If the writing is performed to the doorbell register, a test is made to see if a "Next_ORB" field of the ORB designated by the ORB pointer is NULL (there is no subsequent ORB) (step S1907). If it is NULL, the processing routine is returned to step S1901.

If it is not NULL, step S1908 follows and the value in the "Next_ORB" field of the ORB designated by the current ORB pointer is written into the ORB pointer and updated (step S1908). The processing routine advances to step S1903.

If the address of the ORB to be processed is obtained in the ORB pointer as mentioned above, the ORB is read out from the address (step S1903). The pointer indicating the free area in the prefetch pool is taken out from the free reference list and the read-out command ORB is stored into the free area (step S1905).

The reference queue in which the command should be queued is selected with reference to the "QueueID" field of the ORB (step S1905). The pointer extracted from the free reference list is queued to the end of the selected reference queue (step S1906).

After that, the "Next_ORB" field of the ORB in which the queueing process is finished is referred to and if its contents indicate NULL, namely, if there is not the linked ORB, the processing routine is returned to step S1901, the next ORB is linked, and the apparatus waits until the writing operation is performed to the doorbell register or ORB pointer. If there is the linked ORB, the value in the "Next_ORB" field of the ORB designated by the ORB pointer is written into the ORB pointer and updated (step S1908). The ORBs linked in the ORB list are sequentially stored into the prefetch pool.

In this manner, the ORBs in the ORB list are stored into the prefetch pool.

Processes in steps S1904 to S1906 are the same as those described as an ORB dispatcher in FIG. 1.

(Execution Agent)

FIG. 20 shows a procedure of the execution agent for each reference queue. Those procedures can be performed independently by a thread schedule by one thread in each reference queue. Or, all of the reference queues can be executed in a single thread by independently scheduling them in a manner such that the management of one reference queue is not blocked by the operations of the other reference queues. Or, a combination of those methods can be also used. FIG. 20 shows a procedure of the execution agent for one reference queue. The procedure of the execution agent for each reference queue is performed every reference queue.

The execution agent first discriminates whether the pointer to the command in the prefetch pool exists in the reference queue or not (step S2001). The ORB is extracted from the prefetch pool (step S2002). The above processes are performed by using the pointer indicative of the head of the reference queue. When the ORB is read out, a check is made to see if the value in the "Seq_ID" field of the ORB is smaller than the value of a variable SequenceIdentifier held by the execution agent (step S2003). Both Seq_ID and SequenceIdentifier are finite digit numbers. Therefore, when Seq_ID and SequenceIdentifier are expressed by n bits, in the comparison in step S2003, it is defined that $((2^n-1)<0$ $(=2^n))$.

In the ordinary sequence, 1 is added to SequenceIdentifier after completion of the process of one ORB as will be explained hereinlater. SequenceIdentifier and Seq_ID of the ORB are set to the same digit number and Seq_ID is also added by 1 at a time. Therefore, when the process is progressing without a trouble, SequenceIdentifier and Seq_ID of the ORB ought to coincide in step S2003. Therefore, when the process normally progresses, the processing routine is shifted from step S2003 to step S2004.

Whether the buffer is ready in the client or not is discriminated (step S2004). If it is ready, the data of a predetermined size from the address in which the value of data_descriptor of the ORB and an offset value stored in NextexecPointer held in the execution agent are added is accessed. The data is transmitted and received to/from the buffer prepared by the client (step S2005).

In case of newly performing the process of the ORB, since the offset value is equal to 0, data is read out from the head of the buffer indicated by the ORB. In case of subsequently reading out the buffer from the intermitted location in the buffer which has been read out to the halfway, since the offset indicates the subsequent address in the buffer, by adding it, the data can be continuously read out from the intermitted location in the buffer which has been read out to the halfway. When the data is stored into the buffer, NextexecPointer is updated in a manner such that (the value of data_descriptor+offset) indicates the address to be subsequently read out (step S2006). Such reading/writing operations are performed until the size of data reaches the size indicated by data_size of the ORB (step S2007).

When the processes of one ORB are finished, 1 is added to SequenceIdentifier and it is updated (step S2008). NextexecPointer (offset) is initialized to 0 (step S2009).

If the processing routine is finished, a status block to notify of the completion of the processes is formed (step S2010) and written into the status FIFO (step S2011). The end of the process is notified to the client of the target (step S2012). At the same time, the pointer in the reference queue indicative of the relevant command is returned to the free reference list.

Figure 18:
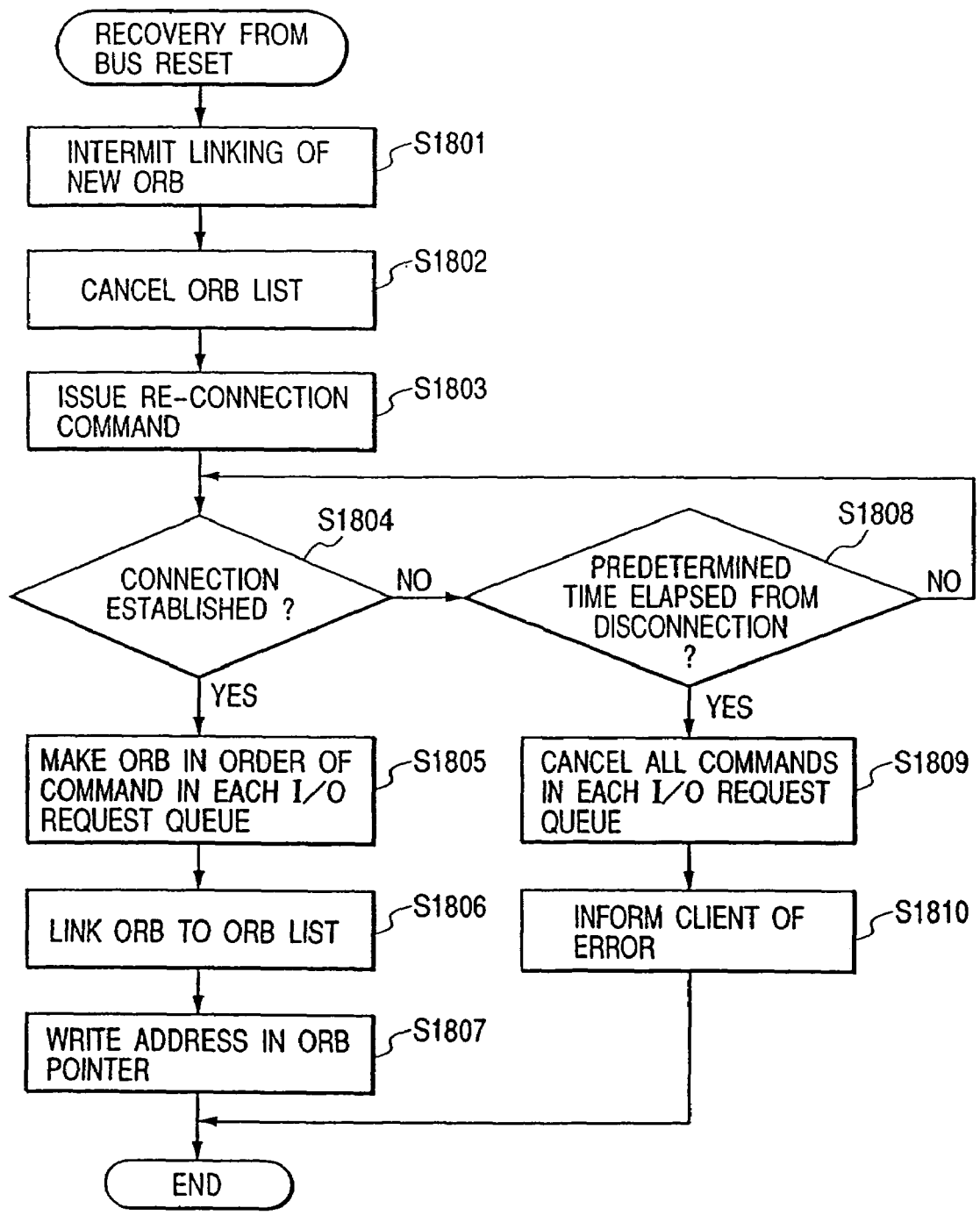
FIG. 18 is a flowchart for a recovery processing procedure which is executed by the SHPT-2 processor of the initiator just after a bus reset.

The case where Seq_ID of the ORB is smaller than SequenceIdentifier in step S2003 corresponds to the case such that the initiator reproduces the ORB list by the procedure of FIG. 18 due to the bus reset or the like. For example, with respect to a certain ORB, even if the target finished the processes and the value of SequenceIdentifier was also updated, when the bus reset occurs at a point when its status block does not reach the initiator, the initiator also includes the ORB into the ORB list. In this case, the value of SequenceIdentifier of the execution agent is larger than Seq_ID of the ORB. In this case, since the processes of the ORB have already been finished, the status block is sent to the initiator in step S2010 and subsequent steps.

<Connecting Procedure of Initiator>

Figure 16:
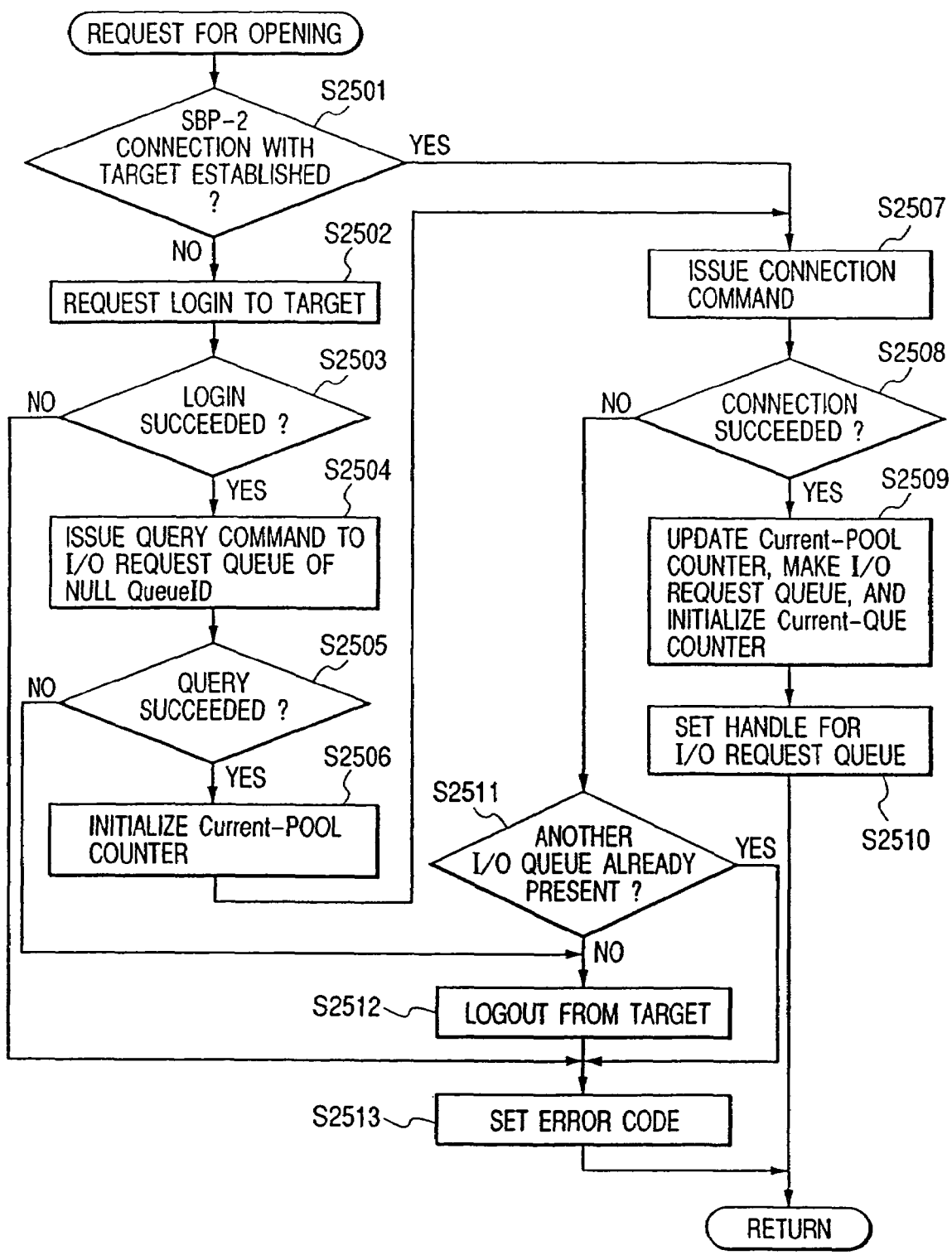
FIG. 16 is a flowchart for a processing procedure which is executed by the SHPT-2 processor of the initiator in response to an opening request from the client.

FIG. 16 shows a processing procedure for an opening request from the client on the initiator side. When the opening request from the client is received, a check is first made to see if the SBP-2 connection (login state) with the target of the connection destination has already been established (step S2501). If the SBP-2 connection has already been established, step S2507 follows. If the SBP-2 connection is not established yet, a login request (SBP-2 connecting request) is issued to the target (step S2502). Whether the login has succeeded or not is discriminated (step S2503). When the login fails, step S2513 follows, an error code is set to a return value, and the processing routine is returned. When the login succeeds, an I/O request queue in which QueueID is equal to 0 is formed and a query command is issued thereto (step S2504). Subsequently, whether the query command has succeeded or not is discriminated (step S2505). If it fails, step S2512 follows and a logout is executed. After that, step S2513 follows. If the query command succeeds, the Current-POOL counter is set on the basis of "Init_POOL" of the status block for the query command. At this time, since the I/O request queue in which QueueID corresponds to 0 has already been tacitly formed, one or more areas are set as reserved areas of the I/O request queue in which QueueID corresponds to 0 and the remaining areas are set into the Current-POOL counter (step S2506).

Further, step S2507 follows and a desired ServiceID and Mode are designated for the I/O request queue in which QueueID corresponds to 0 and the connection command is queued (step S2507). At the time of connection, "i" bit is set to 1 in case of obtaining an increase amount of the prefetch pool for the target. Whether the connection command has succeeded or not is discriminated (step S2508). If it fails, a check is made in step S2511 to see if another I/O request queue except for the queue corresponding to QueueID0 which is tacitly prepared is already present. If it is absent, a logout from the target is performed, namely, SBP-2 is disconnected (step S2512) and step S2513 follows. If it is present, step S2513 follows without performing the logout. When the connection command succeeds, a new I/O request queue is formed in correspondence to QueueID1 and QueueID2 of the status block. After that, a handle for allowing the client to specify this connection is made correspond. One or more reserved areas are set for each queue on the basis of the sum of the value in a Pool_Inc field of the status block and the value in the current Current-POOL register and the value in the Current-POOL register is updated by the number of remaining areas (step S2509). A handle which was made correspond to the I/O request queue formed finally is set to the return value (step S2510) and returned to the client on the calling source side.

<Connecting Procedure of Target>

Figure 17:
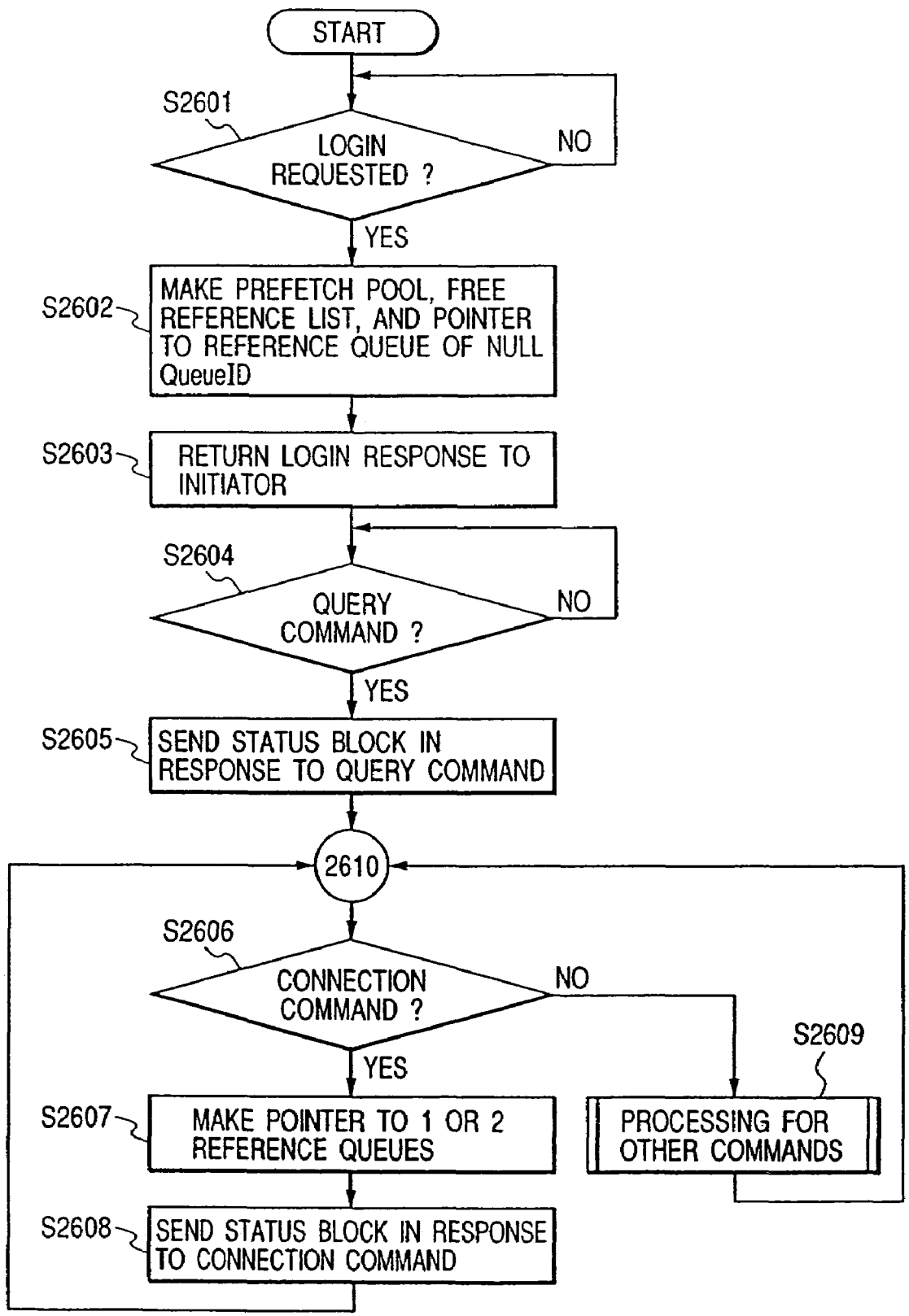
FIG. 17 is a flowchart for a processing procedure for a connecting request of the target.

FIG. 17 shows a processing procedure on the target side corresponding to the processing procedure for the opening request from the client on the initiator side in FIG. 16.

The target first waits for the arrival of a login request (step S2601).

When the login request is received, the target performs a confirmation of the ID of the initiator, a formation of a login descriptor, and the like as operations specified in SBP-2. The target also forms a prefetch pool having at least one entry and forms a free reference list as a list of the pointers for the entries in the prefetch pool. A pointer for the reference queue in which QueueID is equal to 0 and the like are also prepared (step S2602). After completion of the above preparation, the target returns a login response specified in SBP-2 to the initiator (step S2603). Subsequently, the target waits for the arrival of the query command (step S2604). When the query command is received, a size of formed prefetch pool is added into the "Init_POOL" field and a status block in response to the query command is sent (step S2605). The preparation for the communication by SHPT-2 can be made in this manner.

A loop in step S2610 and subsequent steps relates to a processing procedure of the execution agent based on the reference queue of QueueID0. Whether the command is the connection command or not is discriminated in step S2606. If it is not the connection command, the processes of other commands are performed in step S2609. The processing routine is returned to step S2610. If it is the connection command, pointers for one or two reference queues or the like are formed in accordance with the mode designated in the Mode field. At this time, if "i" bit of the connection command is equal to 1, entries of the number that is equal to or larger than the number of formed reference queues are added into the prefetch queue (step S2607). The IDs of the formed reference queues and the number of entries added into the prefetch queue are returned to the initiator by the status block for the connection command (step S2608). The communication between the clients can be performed by using the reference queues formed after that.

<Connection End Procedure of Initiator>

Figure 21:
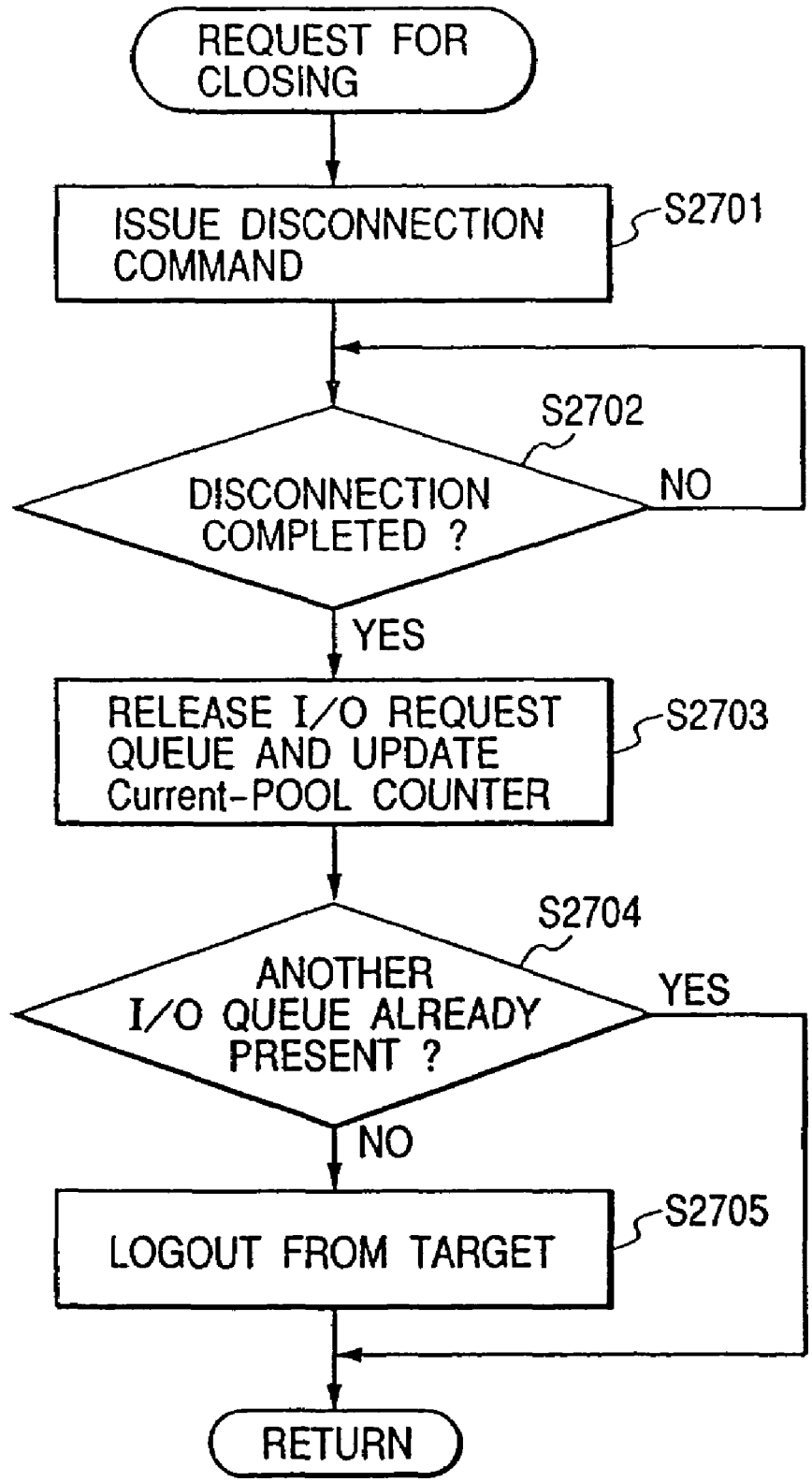
FIG. 21 is a flowchart for a processing procedure which is executed by the SHPT-2 processor of the initiator in response to a closing request from the client.

FIG. 21 shows a processing procedure for a closing request from the client on the initiator side. When the closing request is received, a disconnection command is first issued. When the user wants to disconnect after the command which has already been queued in the I/0 request queue of relevant QueueID is finished, the "QueueID" field of the disconnection command is set to relevant QueueID0. When the user wants to disconnect irrespective of the queued command, the disconnection command is issued to QueueID. In this case, a queue to be disconnected is designated in the "QueueID1" and "QueueID2" fields (step S2701). The apparatus subsequently waits for completion of the disconnection command (step S2702). After completion of the disconnection command, if the ORBs for the disconnected queues remain in the current ORB list, all of them are invalidated by the control field specified by SBP-2. The I/O request queue formed at the time of connection is released. The count value of the Current-POOL counter is increased by a value corresponding to the number of ORBs in the current ORB list shown by the count value of the Current-QUE counter of the I/O request queue and is, further, reduced by a value corresponding to the increased value in the prefetch pool received upon connection (step S2703). A check is further made to see if another I/O request queue except for the queue of QueueID0 that is tacitly prepared is already present (step S2704). If it is absent, a logout from the target is performed, namely, SBP-2 is disconnected (step S2705). The handle allocated upon connection is released. The processing routine is returned.

<Connection End Procedure of Target>

Figure 22:
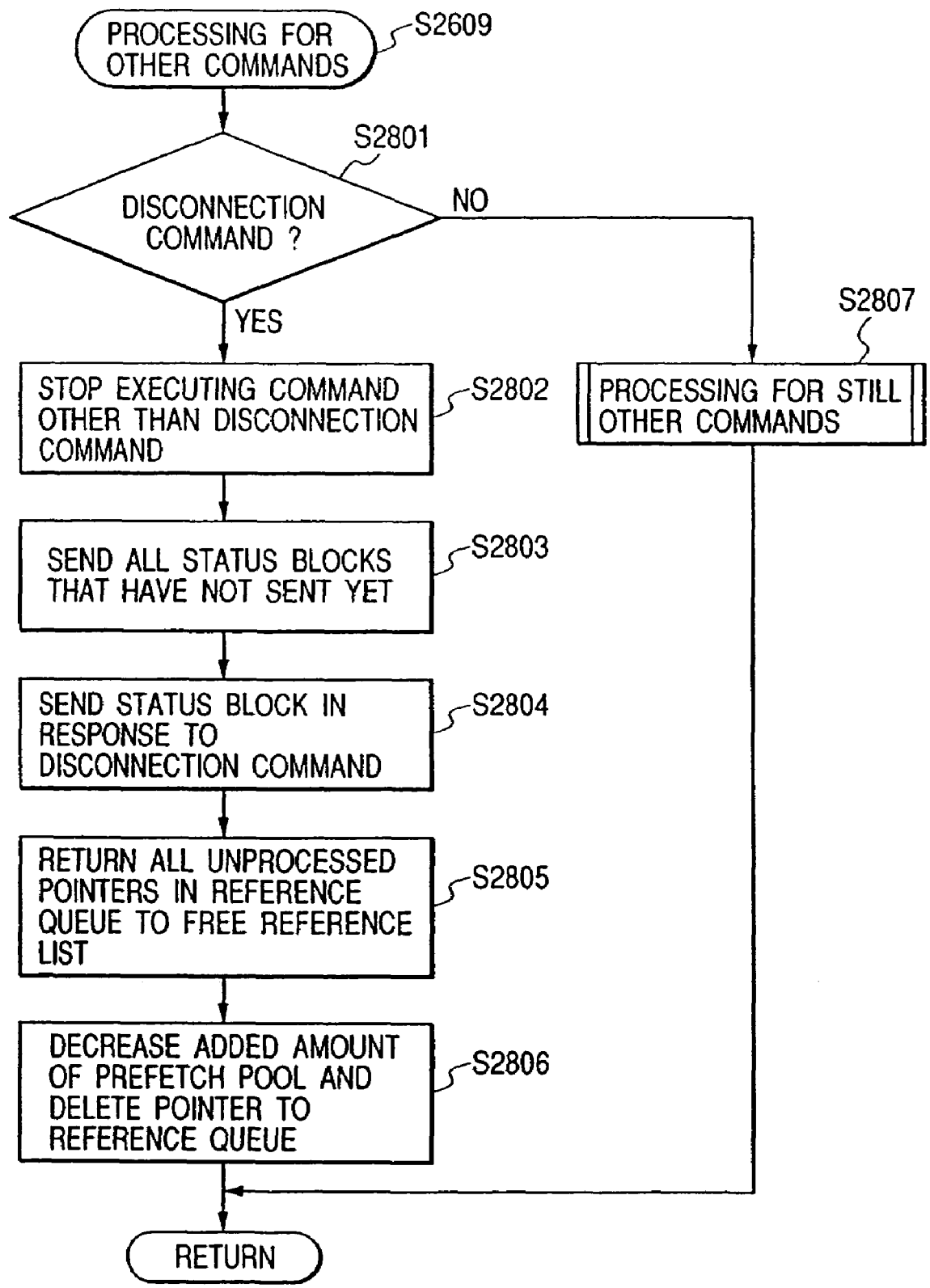
FIG. 22 is a flowchart for a processing procedure for a disconnecting request of the target.

FIG. 22 shows a disconnection processing procedure of the target. This procedure is located in step S2609 in FIG. 17. First, whether the command is the disconnection command or not is discriminated (step S2801). If it is not the disconnection command, processes of other commands are further performed (step S2807). If it is the disconnection command, among the commands referred to by the reference queue serving as a target of the disconnection, if there is a command which is being executed except for the disconnection command, the execution of such a command is stopped (step S2802). After the execution is stopped, if there are status blocks which are not sent yet among the status blocks for the commands other than the disconnection command referred to by the reference queue, all of them are sent (step S2803). After that, the status block in response to the disconnection command is returned (step S2804). At this time point, all of the un-processed pointers remaining in the reference queue are returned to the free reference list (step S2805). If the prefetch pool was increased upon connection, the added amount is decreased and the pointers in the free reference list which is referred to are deleted by the decreased amount. Further, the pointers or the like for the reference queues are also deleted (step S2806). The processing routine is returned.

As shown in FIGS. 7A and 7B, a field of a queue identifier such as QueueID is provided for the ORB. Therefore, the SHPT-2 processor and ORB dispatcher identify the queue identifier and each of them independently executes the process, namely, performs the formation and process of the ORB every queue, so that a multiconnection (channel) by a plurality of queues can be realized. In this case, even in one piece of equipment, an asynchronous communication can be performed every client by allocating one connection (channel) to each of a plurality of clients included there.

Therefore, for example, in case of a digital hybrid apparatus, if an application serving as a client is provided for each of the scanners and printers which the hybrid apparatus has, the hybrid apparatus can be used by the host computer connected thereto as if each function were independent equipment. As shown in the flowcharts, since the management of each queue and the execution agent are logically independent processes, the multiconnection (channel) can be easily realized.

By using two queues which are identified by QueueID for one connection, a data exchange can be performed bidirectionally between the initiator and the target by a simple control procedure. That is, the initiator can send desired data to the target anytime. The target can read out the data sent from the initiator in accordance with circumstances of the target itself. So long as the initiator is prepared, the target can send data to the initiator any time irrespective of a spontaneous purpose or a request from the initiator. Even if the bus reset occurs, the continuation of the processes from the intermitted state just before the bus reset can be guaranteed.

Further, the initiator dynamically performs the allocation of the whole command pool area of the target on the multiplex path by the queue, so that a communicating efficiency and a resource using efficiency of the target are improved. Since the command pool area of the target is increased or decreased in accordance with the number of queues which are used for connection, the resource using efficiency of the target is improved.

(Other Embodiments)

The invention can be applied to a system constructed by a plurality of equipment (for example, a host computer, interface equipment, a reader, a printer, and the like) or can be also applied to an apparatus (for example, a copying apparatus, a facsimile apparatus, or the like) comprising one piece of equipment.

As for the initiator, the object of the invention is also accomplished by a method whereby a storage medium in which program codes of the procedures shown in FIGS. 3 to 6, 16, 18, and 21 have been recorded is supplied to a computer and the computer (or a CPU or an MPU) reads out and executes the program codes stored in the storage medium. As for the target as well, the object of the invention can be also accomplished by a method whereby a storage medium in which program codes of the procedures shown in FIGS. 17, 19, 20, and 22 have been recorded is supplied to a computer and the computer (or a CPU or an MPU) reads out and executes the program codes stored in the storage medium.

In this case, the program codes themselves read out from the storage medium realize the functions of the foregoing embodiment and the storage medium in which the program codes have been stored constructs the invention.

As a storage medium to supply the program codes, for example, a floppy disk, a hard disk, an optical disk, a magnetooptic disk, a CD-ROM, a CD-R, a magnetic tape, a non-volatile memory card, an ROM, or the like can be used.

The invention incorporates not only a case where the functions of the embodiment mentioned above are realized by executing the read-out program codes by a computer but also a case where the functions of the embodiment mentioned above are realized by a method whereby the OS (Operating System) or the like which operates on the computer executes a part or all of the actual processes on the basis of instructions of the program codes and the functions of the embodiment mentioned above are realized by those processes.

Further, the invention also incorporates a case where the program codes read out from the storage medium are written into a memory equipped for a function expanding board inserted into the computer or a function expanding unit connected to the computer and, after that, a CPU or the like equipped for the function expanding board or function expanding unit executes a part or all of the actual processes on the basis of instructions of the program codes, and the functions of the embodiment mentioned above are realized by those processes.

A main apparatus serving as an initiator by executing the program codes read out from the storage medium is not limited to the computer but any data transfer equipment can be used so long as it has a login ability of SBP-2.

As for the target, pipeline processes can be realized by using a plurality of reference queues, for example, by storing a print job into a first reference queue, storing a read command to confirm a status of the target into a second queue, and storing a finisher control command into a third queue, and after completion of the printing based on a print job, a next print job can be stored into the first reference queue prior to finishing the execution of the function by the finisher.

(Second Embodiment)

Figure 23:
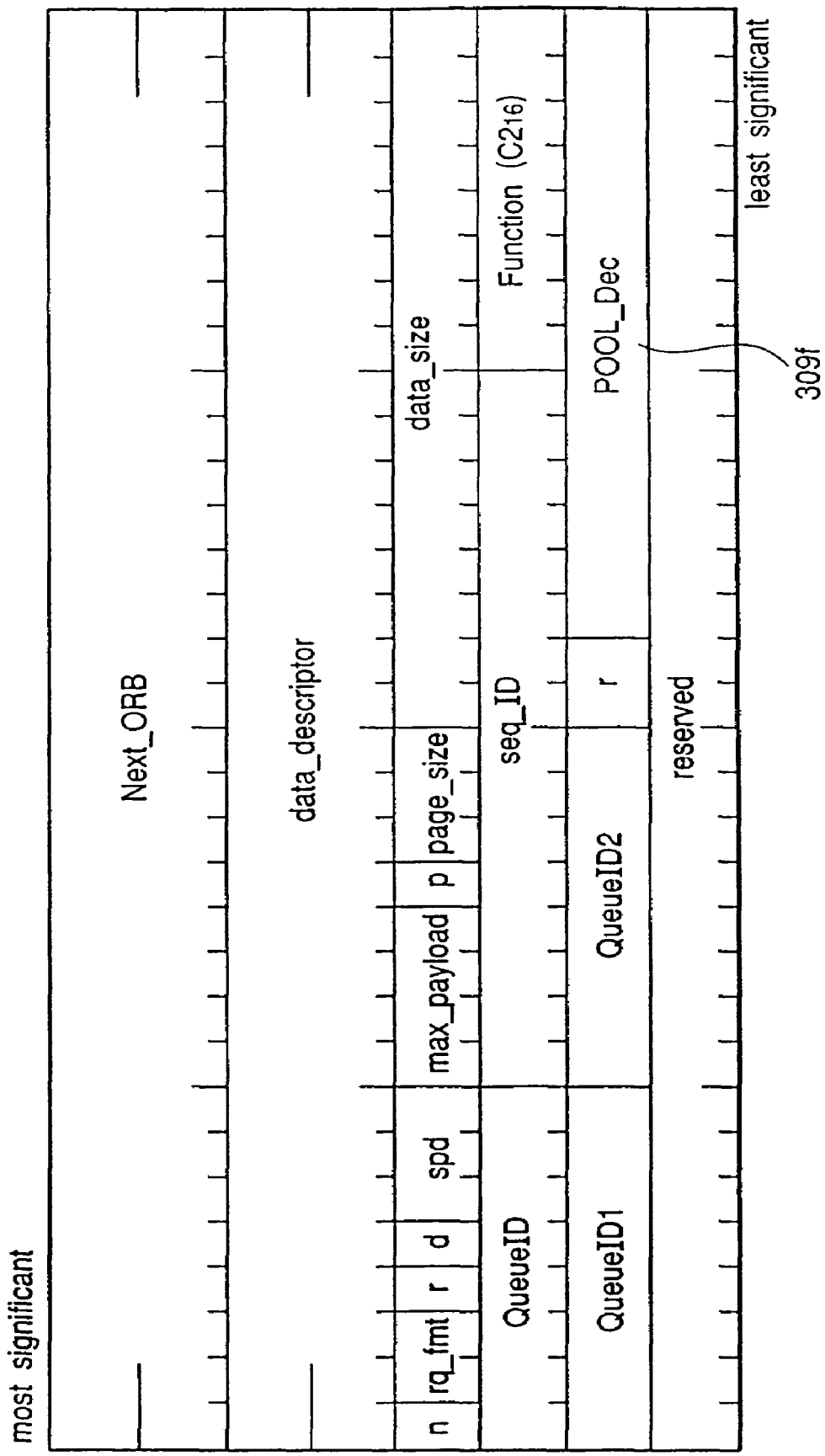
FIG. 23 is a diagram showing a format of a disconnection command ORB according to the second embodiment.

Although the first embodiment has been constructed in a manner such that the capacity of the prefetch pool upon disconnection is decreased by the increased amount at the time of the corresponding connection, the initiator can instruct the decrease amount upon disconnection. In this case, for the disconnection command ORB in FIG. 11, a "POOL_Dec" field 309f is provided and an amount of prefetch pool to be released to the target is designated in this field when the initiator issues the disconnection command as shown in FIG. 23. The command is issued in step S2701 in FIG. 21. The target decreases the prefetch pool by the amount designated by the "POOL_Dec" field in step S2806 in FIG. 22.

Even in this embodiment, the following effects are obtained in a manner similar to the first embodiment. The SHPT-2 processor and ORB dispatcher identify the queue identifier and each of them independently executes the process, namely, performs the formation and process of the ORB every queue, so that a multiconnection (channel) by a plurality of queues can be realized. In this case, even in one piece of equipment, an asynchronous communication can be performed every client by allocating one connection (channel) to each of a plurality of clients included therein.

Therefore, for example, in case of a digital hybrid apparatus, if an application serving as a client is provided for each of the scanners and printers which the hybrid apparatus has, the hybrid apparatus can be used by the host computer connected thereto as if each function were independent equipment. As shown in the flowcharts, since the management of each queue and the execution agent are logically independent processes, the multiconnection (channel) can be easily realized.

By using two queues which are identified by QueueID for one connection, a data exchange can be performed bidirectionally between the initiator and the target by a simple control procedure. That is, the initiator can send desired data to the target anytime. The target can read out the data sent from the initiator in accordance with circumstances of the target itself. So long as the initiator is prepared, the target can send data to the initiator any time irrespective of a spontaneous purpose or a request from the initiator. Even if the bus reset occurs, the continuation of the processes from the intermitted state just before the bus reset can be guaranteed.

Further, the initiator dynamically performs the allocation of the whole command pool area of the target on the multiplex path by the queue, so that a communicating efficiency and a resource using efficiency of the target are improved. Since the command pool area of the target is increased or decreased in accordance with the number of queues which are used for connection, the resource using efficiency of the target is improved.

(Third Embodiment)

Although the first embodiment has been constructed in a manner such that the initiator designates only a discrimination about whether the increase in the prefetch pool is requested or not by "i" bit in the connection command, the initiator can also request the increase by designating the increase number. In this case, it is sufficient to increase the number of bits in the "i" field in the connection command in FIG. 10 and indicate the increase number. Further, although the first embodiment has been constructed in a manner such that the reserved areas corresponding to the prefetch pool for the queue on the initiator side are set only at the time of the connection, the reserved areas can be also increased or decreased anytime other than the time of the connection. In this case, the increased amount of the reserved areas is set so as not to exceed the value in the Current-POOL counter, the number of reserved areas is increased and the count value in the Current-POOL counter is decreased within such a range. To decrease it, when the number of ORBs (in the current ORB list) which is shown by the count value in the Current-QUE counter and belongs to the relevant queue is lower than the number of reserved areas, the count value can be decreased in a range such that a difference between the number of ORBs and the number of reserved areas is set to an upper limit and a range in which the number of reserved areas after the reduction is equal to or larger than 1 in such a range. In this case, the number of reserved areas is reduced within such a range and the count value in the Current-POOL counter is increased.

Even in this embodiment, the following effects are obtained in a manner similar to those in the first embodiment. The SHPT-2 processor and ORB dispatcher identify the queue identifier and each of them independently executes the process, namely, performs the formation and process of the ORB every queue, so that a multiconnection (channel) by a plurality of queues can be realized. In this case, even in one piece of equipment, an asynchronous communication can be performed every client by allocating one connection (channel) to each of a plurality of clients included there.

Therefore, for example, in case of a digital hybrid apparatus, if an application serving as a client is provided for each of the scanners and printers which the hybrid apparatus has, the hybrid apparatus can be used by the host computer connected thereto as if each function were independent equipment. As shown in the flowcharts, since the management of each queue and the execution agent are logically independent processes, the multiconnection (channel) can be easily realized.

By using two queues which are identified by QueueID for one connection, a data exchange can be performed bidirectionally between the initiator and the target by a simple control procedure. That is, the initiator can send desired data to the target at any time. The target can read out the data sent from the initiator in accordance with circumstances of the target itself. So long as the initiator is prepared, the target can send data to the initiator any time irrespective of a spontaneous purpose or a request from the initiator. Even if the bus reset occurs, the continuation of the processes from the intermitted state just before the bus reset can be guaranteed.

Further, the initiator dynamically performs the allocation of the whole command pool area of the target on the multiplex path by the queue, so that a communicating efficiency and a resource using efficiency of the target are improved. Since the command pool area of the target is increased or decreased in accordance with the number of queues which are used for connection, the resource using efficiency of the target is improved.

(Fourth Embodiment)

In the embodiment, although the increase or decrease of the prefetch pool is designated by the "i" bit 309e of the connection command (FIG. 10) and the disconnection command (FIG. 23), the "POOL_Dec" field, or the like or the value designated in the "POOL_Inc" field in the connection status (FIG. 14) is used, independent commands for increasing or decreasing the prefetch pool can be also provided in place of them.

Figure 25:
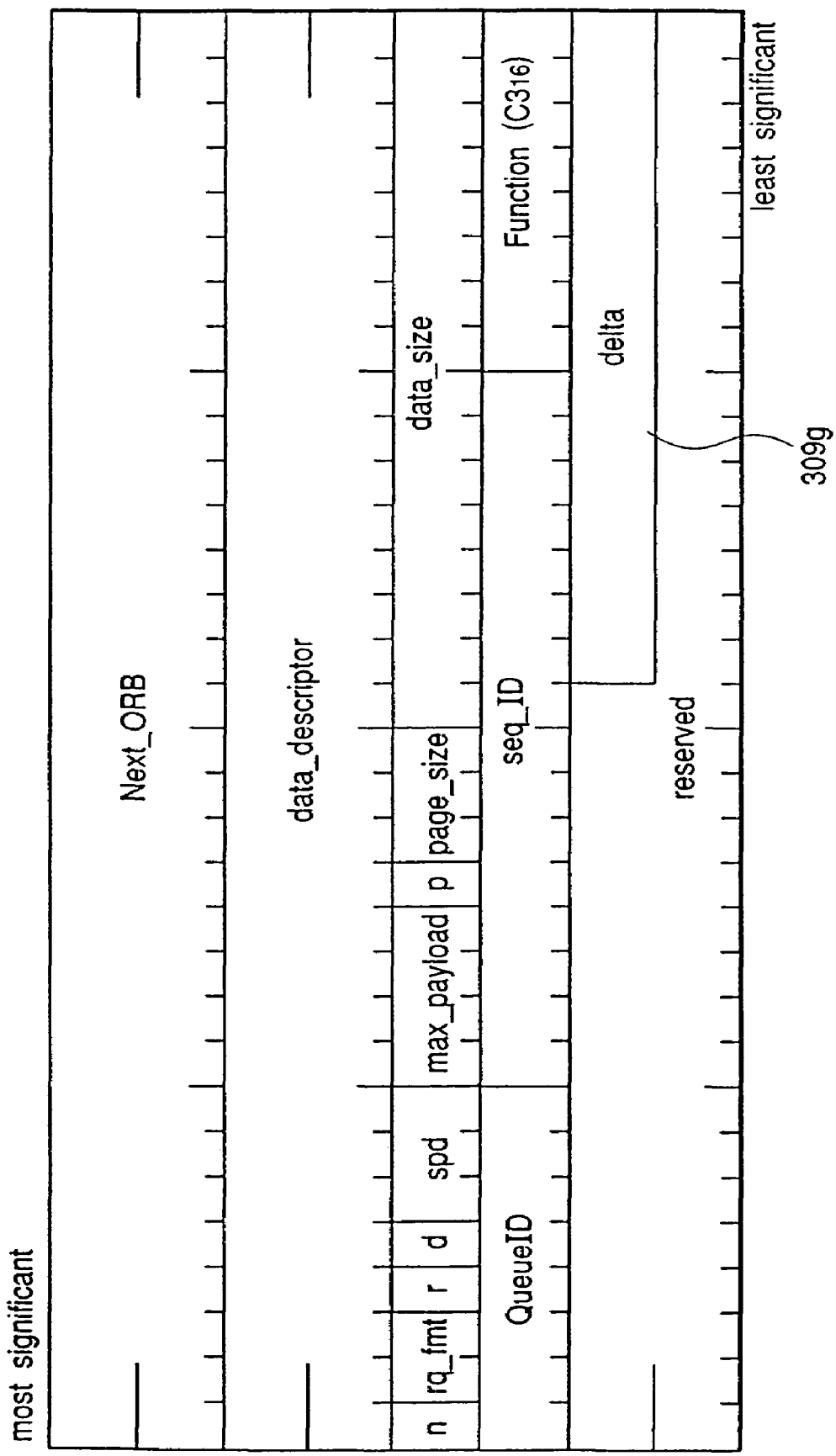
FIG. 25 is a diagram showing a format of a prefetch pool capacity change command.

FIG. 25 shows a format of a prefetch pool capacity changing command (function code=C3H). In FIG. 25, a "delta" field 309g shows a numerical value with a sign of a format of a complement of 2. If this field is positive, the increase in the prefetch pool is instructed to the target. If it is negative, the decrease in the prefetch pool is instructed to the target. The target actually increases or decreases the prefetch pool in response to the instruction of the command.

In case of using the command, when the opening request from the client of the initiator is processed, if the increase in the prefetch pool is necessary, prior to step S2507 in FIG. 16, the initiator issues a prefetch pool changing command, thereby increasing the prefetch pool. Since the target has already received the prefetch pool changing command separately if necessary before step S2607 in FIG. 17, only the pointers or the like for the reference queues are formed. When the closing request from the client of the initiator is processed, after the disconnection command succeeds (step S2703), the prefetch pool capacity changing command is issued, thereby reducing the prefetch pool. Since the prefetch pool capacity changing command ought to be issued from the initiator later, in the process (FIG. 22) of the disconnection command, only the pointers or the like which are used for the reference queues are deleted and the prefetch pool is not decreased in step S2806.

Even in this embodiment, the following effects are obtained in a manner similar to those in the first embodiment. The SHPT-2 processor and ORB dispatcher identify the queue identifier and each of them independently executes the process, namely, performs the formation and process of the ORB every queue, so that a multiconnection (channel) by a plurality of queues can be realized. In this case, even in one piece of equipment, an asynchronous communication can be performed every client by allocating one connection (channel) to each of a plurality of clients included there.

Therefore, for example, in case of a digital hybrid apparatus, if an application serving as a client is provided for each of the scanners and printers which the hybrid apparatus has, the hybrid apparatus can be used by the host computer connected thereto as if each function were independent equipment. As shown in the flowcharts, since the management of each queue and the execution agent are logically independent processes, the multiconnection (channel) can be easily realized.

By using two queues which are identified by QueueID for one connection, a data exchange can be performed bidirectionally between the initiator and the target by a simple control procedure. That is, the initiator can send desired data to the target at any time. The target can read out the data sent from the initiator in accordance with circumstances of the target itself. So long as the initiator is prepared, the target can send data to the initiator any time irrespective of a spontaneous purpose or a request from the initiator. Even if the bus reset occurs, the continuation of the processes from the intermitted state just before the bus reset can be guaranteed.

Further, the initiator dynamically performs the allocation of the whole command pool area of the target on the multiplex path by the queue, so that a communicating efficiency and a resource using efficiency of the target are improved. Since the command pool area of the target is increased or decreased in accordance with the number of queues which are used for connection, the resource using efficiency of the target is improved.

According to the invention as described above, an asynchronous bidirectional communication can be performed and its multichannel can be realized by one login between the initiator and the target and the resources such as processes and memory which are necessary for data exchange can be efficiently used.

Since the IEEE1394 interface is used, in the data transfer to the target side, the target can read out the data in accordance with its circumstances and a situation such that the initiator is occupied by the data transfer due to the circumstances of the target can be prevented.

Since the SBP-2 protocol is used, only the ORB is queued in the target and the data itself which is actually transferred is stored in the initiator for a process waiting period of time. Thus, a capacity of the memory resources of the target can be reduced.

By holding the latest processing state, even if the bus reset occurs, the process can be restarted from the state just before the bus reset after the bus reset, and the normal continuation of the processes can be guaranteed.

The number of commands which can be transmitted from the initiator to the target is not managed every queue of the target but is unitarily managed, so that the resources can be efficiently used.

By dynamically allocating the whole command pool area of the target on the multiplex path due to the queues by the initiator, the communicating efficiency and the resource using efficiency of the target are improved. The command pool areas of the target are increased or decreased in accordance with the number of queues which are used for connection. Thus, the resource using efficiency of the target can be improved.

What is claimed is:

1. A communication control method of exchanging data between an initiator and a target, comprising:
a transmitting step of transmitting a read command and/or a write command from the initiator to the target so as not to exceed the total number of commands which can be held in the target, each command corresponding to a designation indicating to which one of a plurality of queues provided in the target the command corresponds; and
a performing step of, in the target, a read operation to read data from a designated location in a memory area of the initiator or a write operation to write data into a designated location in the memory area of the initiator in accordance with the read or write command,
wherein the initiator allocates the number of commands for each of the plurality of queues so that the initiator can transmit from at least one command up to the number of commands allocated for each queue in said transmitting step, the total number of commands allocated for each queue being smaller than the total number of commands which can be held in the target, and
if the total number of commands that are not allocated for each queue among the total number of commands which can be held in the target is greater than the total number of commands held by the target in excess of the number of commands allocated for each queue, the initiator can transmit, in said transmitting step, a further command in excess of the number of commands allocated for each queue.

2. A method according to claim 1, further comprising:
a holding step of holding, in the target, the transmitted read and/or write commands; and
a queuing step of queuing, in the target, a reference to each of the read and/or write commands held in the target into a respective one of the plurality of queues designated by the designation corresponding to each command.

3. A method according to claim 1, wherein the initiator allocates the number of commands for each queue when the number of queues is increased or decreased.

4. A communication control method of transmitting at least one command from a first apparatus to a second apparatus, comprising:
a command forming step of forming, in the first apparatus, a command corresponding to a designation indicating to which one of a plurality of queues provided in the second apparatus the command corresponds; and
a transmitting step of transmitting the formed command from the first apparatus to the second apparatus so as not to exceed the total number of commands which can be held in the second apparatus,
wherein the first apparatus allocates the number of commands for each of the plurality of queues so that the first apparatus can transmit from at least one command up to the number of commands allocated for each queue in said transmitting step, the total number of commands allocated for each queue being smaller than the total number of commands which can be held in the second apparatus, and
if the total number of commands that are not allocated for each queue among the total number of commands which can be held in the second apparatus is greater than the total number of commands held by the second apparatus in excess of the number of commands allocated for each queue, the first apparatus can transmit, in said transmitting step, a further command in excess of the number of commands allocated for each queue.

5. A method according to claim 4, wherein the second apparatus performs a read operation to read data from a designated location in a memory area of the first apparatus or a write operation to write data into a designated location in the memory area of the first apparatus in accordance with the transmitted command.

6. A method according to claim 4, wherein the first apparatus allocates the number of commands for each queue when the number of queues is increased or decreased.

7. A communication control apparatus transmitting at least one command to an external apparatus, said communication control apparatus comprising:
a command forming unit, adapted for forming a command corresponding to a designation indicating to which one of a plurality of queues provided in the external apparatus the command corresponds; and
a transmitting unit, adapted for transmitting the command formed by said command forming unit to the external apparatus so as not to exceed the total number of commands which can be held by the external apparatus,
wherein the communication control apparatus allocates the number of commands for each of the plurality of queues so that said transmitting unit can transmit from at least one command up to the number of commands allocated for each queue, the total number of commands allocated for each queue being smaller than the total number of commands which can be held in the external apparatus, and if the total number of commands that are not allocated for each queue among the total number of commands which can be held in the external apparatus is greater than the total number of commands held by the external apparatus in excess of the number of commands allocated for each queue, said transmitting unit can transmit a further command in excess of the number of commands allocated for each queue.

8. An apparatus according to claim 7, wherein the external apparatus performs a read operation to read data from a designated location in a memory area of the communication control apparatus or a write operation to write data into a designated location in the memory area of the communication control apparatus in accordance with the transmitted command.

9. An apparatus according to claim 7, wherein the communication control apparatus allocates the number of commands for each queue when the number of queues is increased or decreased.

* * * * *